United States Patent
Burch, V et al.

(10) Patent No.: US 10,878,364 B2
(45) Date of Patent: Dec. 29, 2020

(54) MANAGING LOGISTICS INFORMATION RELATED TO A LOGISTICS CONTAINER USING A CONTAINER INTERFACE DISPLAY APPARATUS

(71) Applicant: FEDEX CORPORATE SERVICES, INC., Collierville, TN (US)

(72) Inventors: Reuben F. Burch, V, Rossville, TN (US); Mark E. Scott, Germantown, TN (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 1039 days.

(21) Appl. No.: 14/993,434

(22) Filed: Jan. 12, 2016

(65) Prior Publication Data

US 2016/0239801 A1    Aug. 18, 2016

Related U.S. Application Data

(60) Provisional application No. 62/117,602, filed on Feb. 18, 2015.

(51) Int. Cl.
*G06Q 10/08* (2012.01)
*H04W 4/80* (2018.01)
(Continued)

(52) U.S. Cl.
CPC ......... *G06Q 10/0833* (2013.01); *B65D 90/48* (2013.01); *G01F 17/00* (2013.01);
(Continued)

(58) Field of Classification Search
CPC ........................... G06K 7/10297; G01B 11/00
See application file for complete search history.

(56) References Cited

U.S. PATENT DOCUMENTS 5,117,096 A    5/1992  Bauer et al.
6,192,400 B1   2/2001  Hanson et al.
(Continued)

FOREIGN PATENT DOCUMENTS

CN    101140639 A    3/2008
CN    201198441 Y    2/2009
(Continued)

OTHER PUBLICATIONS

"Development of an intelligent container prototype for a logistic support robot system in living space" Published by International Conference on Intelligent Robots and Systems (Year: 2007).*
(Continued)

*Primary Examiner* — Jeff Zimmerman
*Assistant Examiner* — Zeina Elchanti
(74) *Attorney, Agent, or Firm* — Withers & Keys, LLC

(57) ABSTRACT

Methods, apparatus, and systems are described for managing logistics information related to a container using a container interface display apparatus. The container interface display apparatus may comprise a mountable housing, a display screen, a memory, a scanner, and a wireless communication interface. The housing is coupled to the container to permit the scanner to identify an item being loaded for shipment within the container. The scanner identifies the item, and the apparatus records an association in memory as part of managed logistics information that reflects an established and tracked relationship between the container and the item. The apparatus increments package count information (another part of the managed logistics information) to reflect that the item is loaded within the container. The apparatus generates electronic logistics monitor information on the display screen to include at least a portion of the managed logistics information related to the container.

38 Claims, 11 Drawing Sheets

(51) Int. Cl.
| | | |
|---|---|---|
| *B65D 90/48* | (2006.01) | |
| *H04W 4/35* | (2018.01) | |
| *G01F 17/00* | (2006.01) | |
| *G01G 19/52* | (2006.01) | |
| *H04W 4/70* | (2018.01) | |
| *G01G 23/18* | (2006.01) | |
| *H04W 4/12* | (2009.01) | |
| *H04W 48/12* | (2009.01) | |
| *G01G 23/37* | (2006.01) | |

(52) U.S. Cl.
CPC ......... *G01G 23/18* (2013.01); *G06Q 10/0838* (2013.01); *H04W 4/12* (2013.01); *H04W 4/35* (2018.02); *H04W 4/70* (2018.02); *H04W 4/80* (2018.02); *B65D 2590/0083* (2013.01); *G01G 19/52* (2013.01); *G01G 23/3735* (2013.01)

(56) References Cited

U.S. PATENT DOCUMENTS

| | | |
|---|---|---|
| 6,437,702 B1 | 8/2002 | Ragland et al. |
| 7,339,460 B2 | 3/2008 | Lane et al. |
| 7,382,253 B2 | 6/2008 | Oliveras |
| 7,421,112 B2 | 9/2008 | Calver et al. |
| 7,468,660 B2 | 12/2008 | Griffin et al. |
| 7,499,802 B2 | 3/2009 | Mishima et al. |
| 7,696,870 B2 | 4/2010 | Zajac et al. |
| 7,933,733 B2 | 4/2011 | Ashrafzadeh et al. |
| 8,047,432 B2 | 11/2011 | Breed |
| 8,317,084 B2 | 11/2012 | Bagai |
| 9,129,248 B2 | 9/2015 | Reynolds et al. |
| 9,576,166 B2 | 2/2017 | Burch et al. |
| 10,089,503 B2 | 10/2018 | Burch, V et al. |
| 10,546,163 B2 | 1/2020 | Burch et al. |
| 10,586,084 B2 | 3/2020 | Burch et al. |
| 10,740,576 B2 | 8/2020 | Burch et al. |
| 2002/0080014 A1 | 6/2002 | McCarthy et al. |
| 2004/0041706 A1 | 3/2004 | Stratmoen et al. |
| 2004/0066500 A1 | 4/2004 | Gokturk et al. |
| 2004/0113783 A1 | 6/2004 | Yayesh |
| 2004/0178880 A1 | 9/2004 | Meyer et al. |
| 2005/0131578 A1 | 6/2005 | Weaver |
| 2005/0179545 A1 | 8/2005 | Bergman et al. |
| 2005/0217904 A1 | 10/2005 | Hughes |
| 2006/0164231 A1 | 7/2006 | Salisbury et al. |
| 2006/0218001 A1 | 9/2006 | Mallet et al. |
| 2007/0115859 A1 | 5/2007 | Meyers |
| 2007/0124020 A1* | 5/2007 | Staples ................. G06Q 10/08 700/229 |
| 2007/0143188 A1 | 6/2007 | Kelley et al. |
| 2008/0249869 A1 | 10/2008 | Angell et al. |
| 2008/0262646 A1 | 10/2008 | Breed |
| 2008/0291033 A1 | 11/2008 | Aghassipour |
| 2009/0014537 A1 | 1/2009 | Gelbman |
| 2009/0015400 A1 | 1/2009 | Breed |
| 2009/0152177 A1 | 6/2009 | Greenspan et al. |
| 2009/0184826 A1* | 7/2009 | Kim ...................... G06Q 10/08 340/572.4 |
| 2009/0189788 A1 | 7/2009 | Faus et al. |
| 2010/0042285 A1 | 2/2010 | Abernethy, Jr. et al. |
| 2010/0106446 A1 | 4/2010 | Ashrafzadeh et al. |
| 2010/0224585 A1 | 9/2010 | Feeley et al. |
| 2011/0062227 A1 | 3/2011 | Bagai |
| 2011/0173092 A1* | 7/2011 | Werbitt ................. H04W 4/00 705/26.8 |
| 2011/0227722 A1 | 9/2011 | Salvat, Jr. |
| 2011/0231158 A1 | 9/2011 | Carpenter et al. |
| 2012/0059769 A1 | 3/2012 | Carpenter |
| 2012/0119935 A1 | 5/2012 | Mohamadi et al. |
| 2012/0130534 A1 | 5/2012 | Wurm |
| 2012/0316458 A1 | 12/2012 | Rahman et al. |
| 2013/0243311 A1 | 9/2013 | van de Vrande et al. |
| 2013/0245991 A1* | 9/2013 | Kriss .................... F25D 29/003 702/150 |
| 2013/0325727 A1 | 12/2013 | MacDonell et al. |
| 2013/0342353 A1 | 12/2013 | Choi et al. |
| 2014/0188749 A1 | 7/2014 | Lanigan, Sr. et al. |
| 2014/0209676 A1 | 7/2014 | Reynolds et al. |
| 2014/0269272 A1 | 9/2014 | Shuey et al. |
| 2014/0372182 A1 | 12/2014 | Groble et al. |
| 2014/0372183 A1 | 12/2014 | Groble et al. |
| 2014/0374478 A1 | 12/2014 | Dearing et al. |
| 2015/0006430 A1 | 1/2015 | Ben-Alexander |
| 2015/0046361 A1 | 2/2015 | Williams et al. |
| 2015/0094876 A1 | 4/2015 | Baldwin |
| 2015/0213705 A1 | 7/2015 | Ehrman et al. |
| 2015/0319520 A1 | 11/2015 | Richardson et al. |
| 2016/0019497 A1* | 1/2016 | Carvajal ............... H04W 4/029 701/519 |
| 2016/0047646 A1* | 2/2016 | Ochsendorf ......... G01C 21/343 348/148 |
| 2016/0171568 A1 | 6/2016 | Cao et al. |
| 2017/0367961 A1 | 12/2017 | Lee et al. |

FOREIGN PATENT DOCUMENTS

| | | |
|---|---|---|
| CN | 101443822 A | 5/2009 |
| CN | 103026214 A | 4/2013 |
| DE | 10018302 A1 | 10/2001 |
| DE | 102005001480 B3 | 10/2006 |
| EP | 2178035 A1 | 4/2010 |
| JP | H05139506 A | 6/1993 |
| JP | H07137835 A | 5/1995 |
| JP | H08244981 A | 9/1996 |
| JP | H09115096 A | 5/1997 |
| JP | 2001092909 A | 4/2001 |
| JP | 2001206515 A | 7/2001 |
| JP | 2002347936 A | 12/2002 |
| JP | 2003081437 A | 3/2003 |
| JP | 2005320695 A | 11/2005 |
| JP | 2006273492 A | 10/2006 |
| JP | 2007076768 A | 3/2007 |
| JP | 2007153577 A | 6/2007 |
| JP | 2009220922 A | 10/2009 |
| WO | 2002071184 A2 | 9/2002 |
| WO | 2011038018 A1 | 3/2011 |
| WO | 2014204698 A2 | 12/2014 |
| WO | 2016133608 A1 | 8/2016 |
| WO | 2016133609 A1 | 8/2016 |

OTHER PUBLICATIONS

PCT Application No. PCT/US16/13019 International Search Report and Written Opinion, dated Apr. 8, 2016.

Craddock et al., Sensor Fusion for Smart Containers, 2005, expert from IET Digital Library, 2 pages.

EP 16752756 Search Report and Written Opinion dated Jul. 13, 2018.

EP 16752757 Search Report and Written Opinion dated Jul. 19, 2018.

Choong et al., "Empty Container Management for Intermodal Transportation networks", Transportation Research Part E, Feb. 19, 2002, Elsevier Science Ltd.

Tijjani et al., "An Approach for Maximizing Container Loading and Minimizing the Waste of Space Using Q-Learning" Published by Computer Engineering Department, Mevlana University (Year: 2013).

Zhang Qian, "Modern Logistics and Automation Recognition Technology", Nov. 2008, pp. 158-159, 1st Edition. China Railway Publishing House.

Xu Lifang, "Industrial Automation Systems and Technology", Harbin Engineering University Press, Aug. 2014, p. 53, 1st Edition.

Japanese Patent Application No. 2020-077961 Office Action dated Jul. 7, 2020, with English Translation.

* cited by examiner

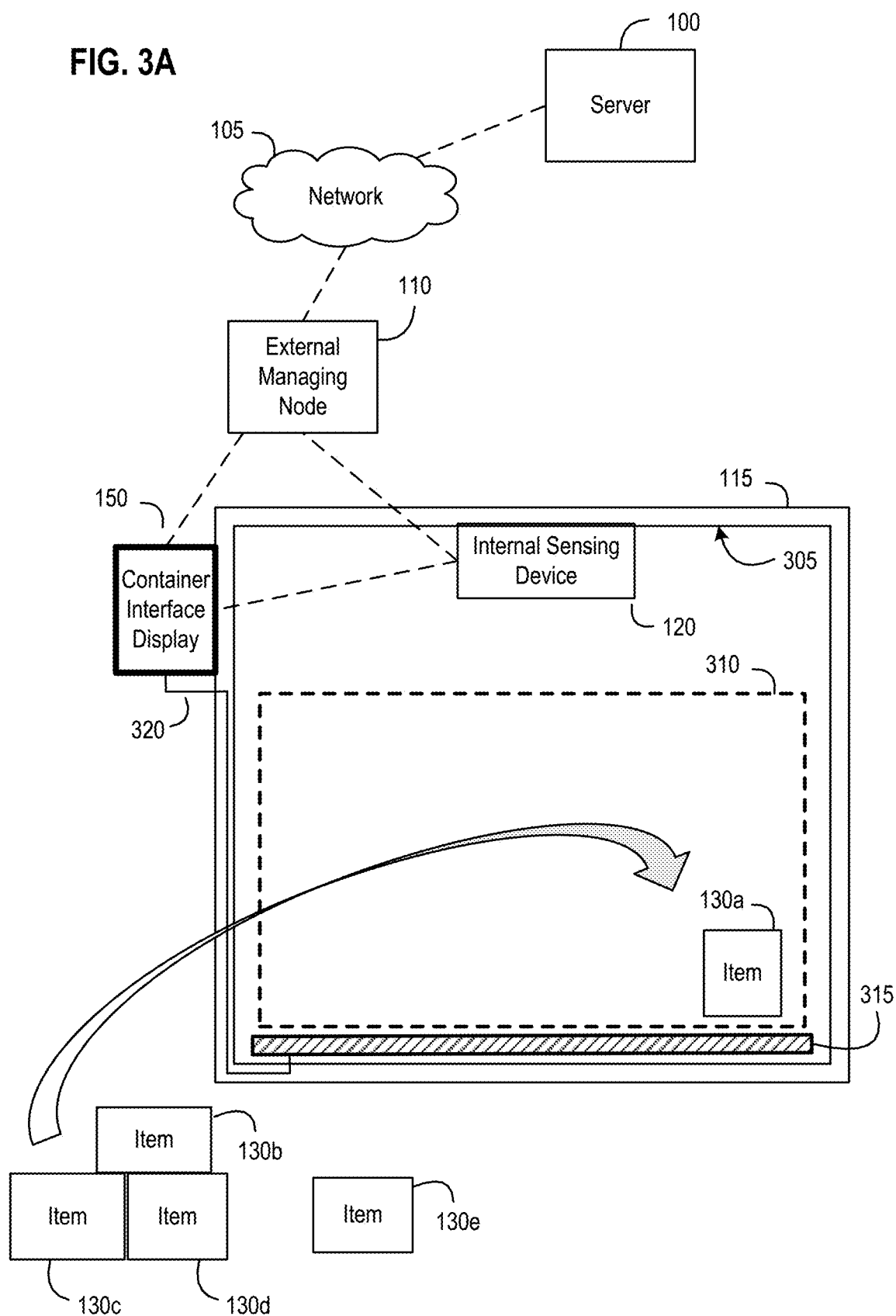

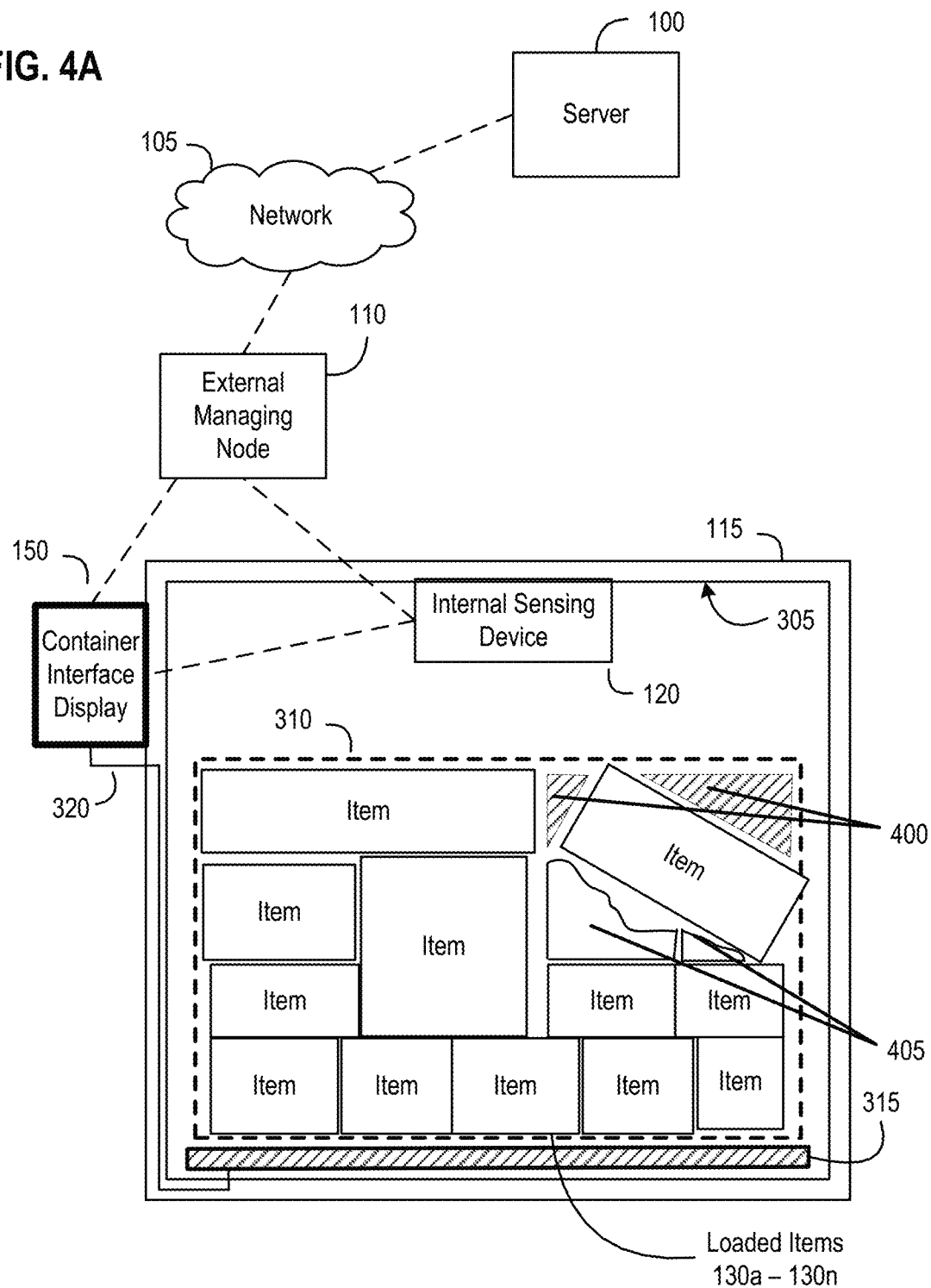

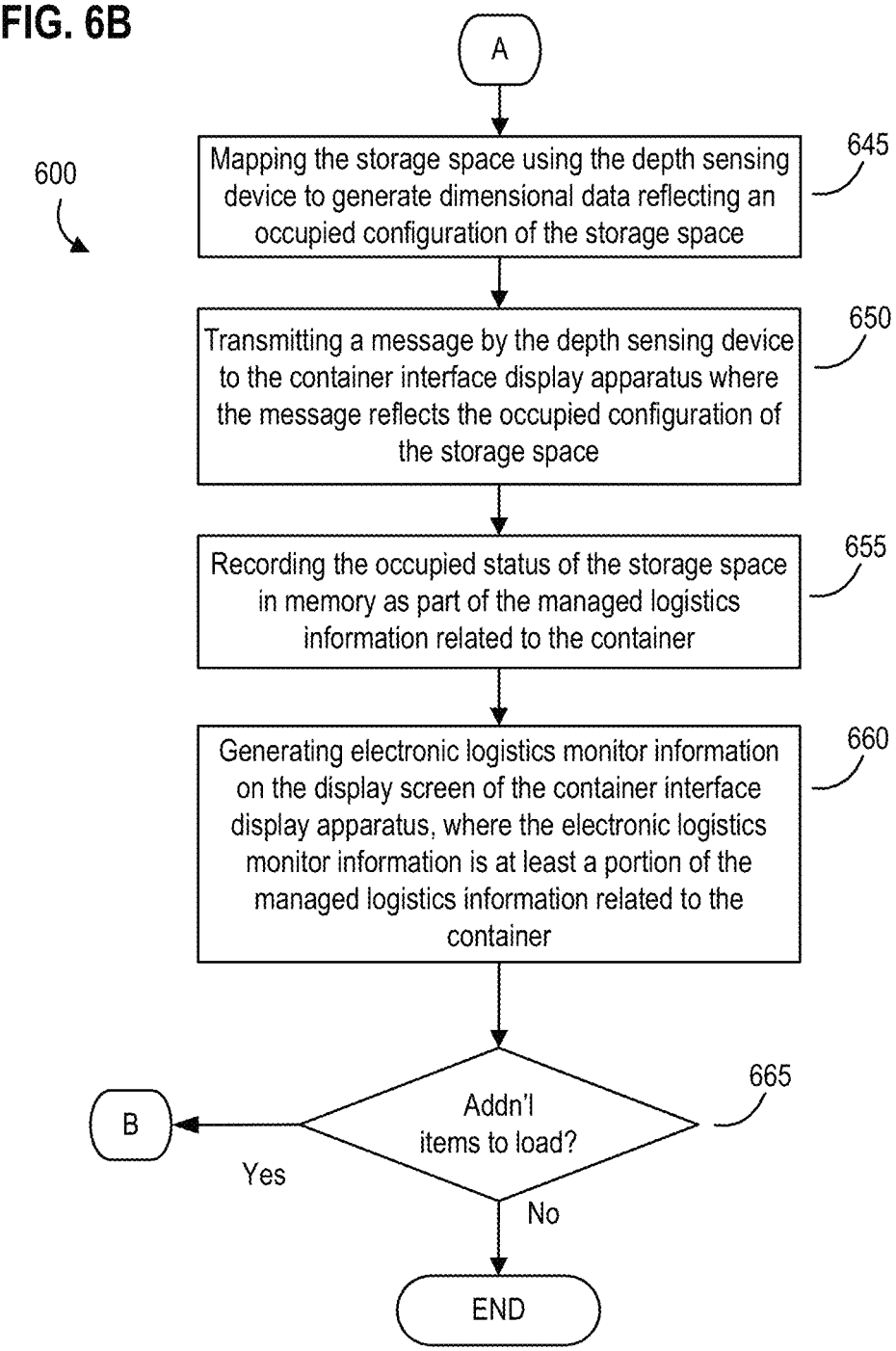

MANAGING LOGISTICS INFORMATION RELATED TO A LOGISTICS CONTAINER USING A CONTAINER INTERFACE DISPLAY APPARATUS

PRIORITY AND RELATED APPLICATIONS

The present application hereby claims the benefit of priority to related Provisional Patent Application No. 62/117,602 and entitled "Enhancing Logistics Operations Methods, Apparatus, and Systems Using a Container Interface Display Apparatus."

The present application is also related in subject matter to the following non-provisional patent applications where each also claims the benefit of priority to the same above-referenced provisional patent application: (1) Non-Provisional patent application Ser. No. 14/993,486 entitled "Methods, Apparatus, and Systems for Managing Logistics Information Related to a Container Having a Scale"; and (2) Non-Provisional patent application Ser. No. 14/993,569 entitled "Methods, Apparatus, and Systems for Generating a Content-Related Notification Using a Container Interface Display Apparatus."

FIELD OF THE DISCLOSURE

The present disclosure generally relates to systems, apparatus, computer-readable media, and methods in the field of shipment management and logistics and, more particularly, to various aspects involving systems, apparatus, computer-readable media, and methods for various improved logistics operations using a container interface display apparatus for enhanced capture, management, and electronic notification of managed logistics information related to a container.

BACKGROUND

A logistics operation that involves shipping one or more items often includes loading a container with the items, transporting the container from an originating point to a destination point, and unloading the contents of what is stored within the container at the destination point. Such a container may include, but is not limited to, a unit load device (ULD) deployed typically with shipments transported on aircraft; shipping containers deployed typically with single mode and/or intermodal freight shipments; a train cargo car; a semi-trailer pulled by a truck; or even a designated storage space within a delivery vehicle (such as a delivery van). Items to be shipped are loaded within the container so that the items may be safely shipped with the container to a different location via a mode of transportation (e.g., aircraft, train, automotive vehicle, and the like).

Effective management of such a logistics operation is needed as a measure, for example, of cost control when shipping items in a container. The time it takes to properly and safely load or unload a container has an impact on the cost effective throughput of the logistics operation as well as the safety of those involved in the logistics operation. Indeed, the manner in which the container is loaded/unloaded can also have an impact on the cost effectiveness of the logistics operation.

Additionally, a conventional logistics operation with a container may rely on a large variety of outwardly visible tags or printed labels on the container. Such tags or labels may be printed and attached to the container as part of, for example, a preload inspection or closeout status event. Typically, such tags or labels may be a scannable object (such as a barcode label) that may be scanned to identify the container or retrieve relevant information on how to process, ship, load, or unload the container. However, the use of printed tags and labels typically incurs significant costs related to numerous portable printers used to make the tags and labels. In addition, a conventional logistics operation or cycle of operations involving the loading, sorting, shipping, and/or unloading of a container may require a significantly large number of different tags or labels. Such tags or labels may need to be removed at different points of such a logistics operation or cycle of operations and become problematic with processing the container if the tags or labels are not removed appropriately. Thus, the costs and logistics operational time necessary when relying on printed tags or labels can be problematic.

To address one or more of these issues, there is a need for a more versatile and intelligent type of equipment or system using such equipment to help in monitoring and managing a logistics operation (e.g., loading, processing, shipping, unloading) or cycle of operations for a container and do so in a cost effective manner.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, aspects of the disclosure relate to an exemplary container interface display device and how it may be deployed as an apparatus and/or as part of a system and used in various embodiments and in various ways to manage and electronically provide logistics information related to a container and to advantageously provide content related notifications that enhance and improve logistics operations involving the container.

In one aspect of the disclosure, a container interface display apparatus is described for managing logistics information related to a container, such as a ULD, tractor trailer, or other shipment container used to transport items between different locations. In general, the container interface display apparatus comprises a processing unit, memory, scanner, wireless communication interface, and a display screen. Each of the memory, scanner, wireless communication interface, and display screen is operatively coupled to the processing unit of the container interface display apparatus. The scanner operates to scan and identify an item to be shipped with the container as the item is being loaded within the container. The wireless communication interface facilitates communication with a node device (such as a server or other processing based network element used to monitor logistics operations) over a wireless communication path. The display screen is disposed near an exterior wall of the container for interaction with logistics personnel loading the container. The memory within the container interface display apparatus maintains at least a logistics information management program code section for execution by the processing unit, package count information, and association information. When the processing unit of the apparatus executes the logistics information management program code section, the processing unit programmatically transforms to become unconventionally operative to identify the item during loading of the container based upon a scanning result signal sent by the scanner to the processing unit; update the association information maintained in the memory (part of the managed logistics information related to the container) to reflect at least an association between the container being loaded and the identified item; increment the package count information maintained in the memory (another part of the managed logistics information related to the container) to reflect that the item to be shipped within the container is loaded within the container; and cause the display screen to provide electronic logistics monitor information on the display screen, wherein the electronic logistics monitor information comprises at least a portion of the managed logistics information related to the container In another aspect of the disclosure, a method is described for managing logistics information related to a container using a container interface display apparatus integrated as part of the container. In general, such an integrated container interface display apparatus comprises a display screen disposed on an exterior wall of the container, a memory, a scanner oriented to permit identifying an item to be shipped within the container as the item is loaded within the container, and a wireless communication interface operative to communicate with a node device (such as a server or processing based tablet or other mobile device used by logistics personnel loading the container). In such a general context, the method begins with the scanner of the integrated container interface display apparatus identifying the item during loading of the container; recording, in the memory of the integrated container interface display apparatus, an association between the container being loaded and the identified item where the association is part of the managed logistics information related to the container; updating, in the memory of the integrated container interface display apparatus, package count information to reflect the that the identified item is loaded within the container where the package count information is also part of the managed logistics information related to the container; and generating electronic logistics monitor information on the display screen of the integrated container interface display apparatus. The generated electronic logistics monitor information comprises at least a portion of the managed logistics information related to the container In still another aspect of the disclosure, another method is described for managing logistics information related to a container using a container interface display apparatus. Such an apparatus may include a mountable housing, a display screen, a memory, a scanner, and a wireless communication interface. In general, the method begins by coupling the container interface display apparatus to a wall of the container using the mountable housing in an orientation permitting the scanner to identify an item to be shipped within the container as the item is being loaded within the container. The method proceeds to have the scanner of the container interface display apparatus identifying the item during loading of the container and recording, in the memory of the container interface display apparatus, an association between the container being loaded and the identified item. Such an association is part of the managed logistics information related to the container. The method continues by incrementing, in the memory of the container interface display apparatus, package count information to reflect that the item to be shipped within the container is loaded within the container, where the package count information is also part of the managed logistics information related to the container. The method then generates electronic logistics monitor information on the display screen of the container interface display apparatus. Such generated electronic logistics monitor information comprises at least a portion of the managed logistics information related to the container.

Each of these aspects respectively effect improvements to the technology of logistics operations involving monitoring and managing logistics information related to a container. Additional advantages of this and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 3A-3C are a series of diagrams illustrating an exemplary system and various exemplary operations involving an exemplary container interface display apparatus deployed on a container having a scale as items are loaded within the container in accordance with one or more embodiments of the invention;

FIGS. 4A-4B are diagrams illustrating various exemplary configurations of elements where an exemplary container interface display apparatus may be used to detect a type of notification event related to what is stored within a container, and proactively display content related information and/or communicate a notification message to other node devices in accordance with one or more embodiments of the invention;

FIGS. 6A and 6B are, collectively, a flow diagram illustrating an exemplary method for managing logistics information related to a container using a container interface display apparatus when the container has a scale in accordance with an embodiment of the invention.

DESCRIPTION OF THE EMBODIMENTS

Figure 1:
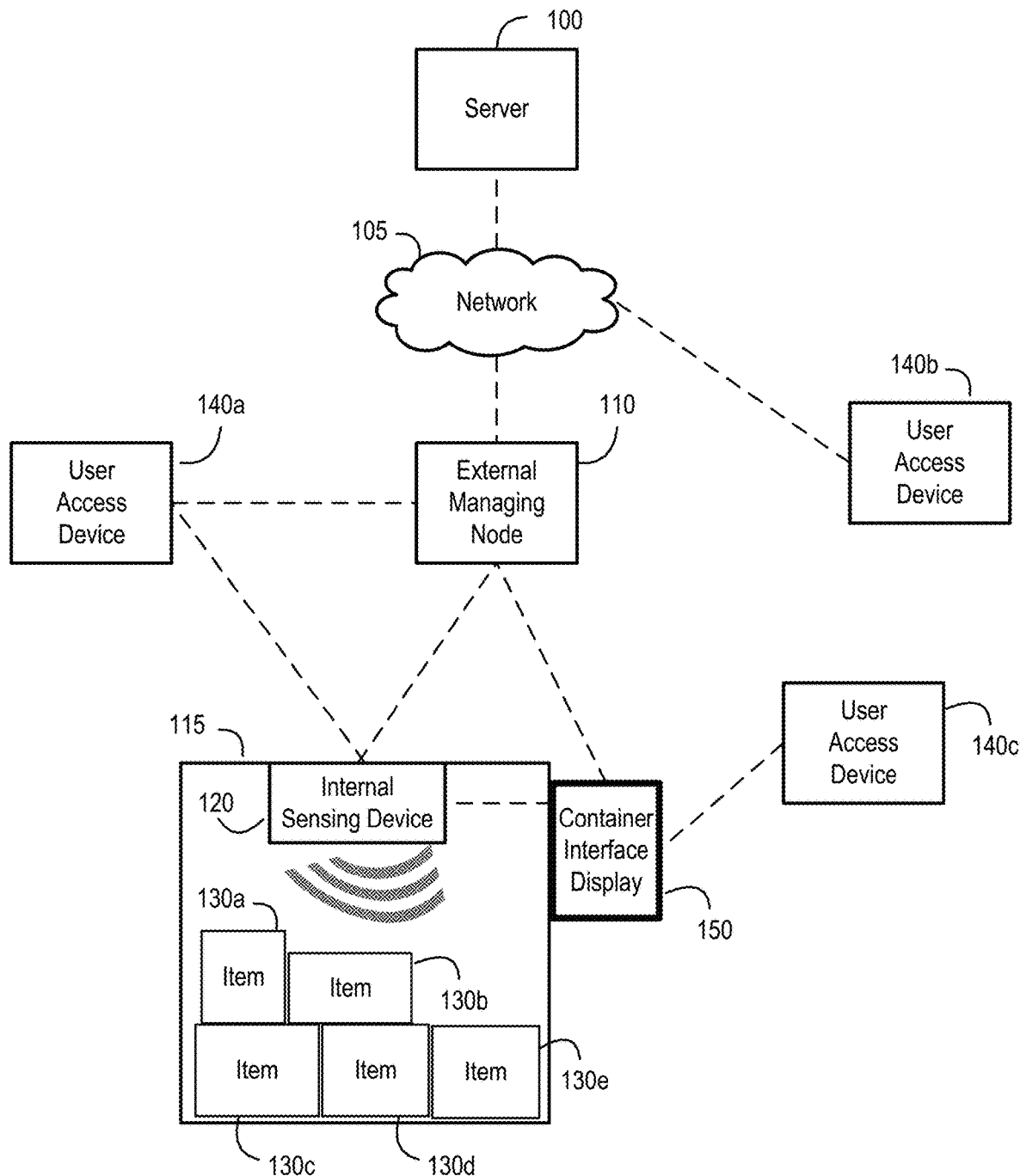
FIG. 1 is a diagram of an exemplary networked system of exemplary interconnected computer systems and logistical node devices, including an exemplary container interface display apparatus in accordance with an embodiment of the invention.

Reference will now be made in detail to various exemplary embodiments. Wherever possible, the same reference numbers are used in the drawings and the description to refer to the same or like parts. However, those skilled in the art will appreciate that different embodiments may implement a particular part in different ways according to the needs of the intended deployment and operating environment for the respective embodiments.

In general, the following describes various embodiments of systems, apparatus, computer-readable media, and methods that employ an exemplary container interface display apparatus to facilitate gathering, managing, and displaying logistics information related to a container as well as generating alert type of notifications related to the what is stored in the container or conditions related to the container. In general, system level embodiments may include one or more devices or nodes (e.g., a container interface display apparatus) that may communicate with another device or node (e.g., an external managing node, an internal sensing device). In some embodiments, the other device or node may be operative to communicate with a server over a network while the lower level node may be unable to communicate directly with the server over the network in some instances. Such system level embodiments may also include one or more user access devices with which a worker or other logistics personnel may interact. Those skilled in the art will appreciate that such a hierarchy of different functional communicating network components (generally referred to as networked system devices) may be characterized as a network of nodes. Those skilled in the art will appreciate that such a network of nodes supporting logistics operations, such as the loading/processing/unloading of a container, may include the server as well as different wired or wireless nodes despite the fact that the server may not be a dedicated wireless component. In other embodiments, the network of nodes may include similar types of wireless nodes or different types of wireless nodes that interoperate in an unconventional manner to enhance logistics operations.

Those skilled in the art will also appreciate that each embodiment described herein effects improvements to particular technologies, such as systems that help support and monitor a logistics operation related to a container. Each embodiment describes a specific technological application that leverages and applies a particular embodiment of a container interface display apparatus where the specific technological application improves or otherwise enhances such technical fields as explained and supported by the disclosure that follows.

FIG. 1 is a diagram of an exemplary networked system of exemplary interconnected computer systems and logistical node devices, including an exemplary container interface display apparatus in accordance with an embodiment of the invention. Referring now to FIG. 1, the exemplary networked system is shown generally comprising a server 100 connected to a network 105, which is also operatively connected to an access point that is external to the containers and generally referred to as an external managing node 110. Server 100 is also indirectly connected to container interface display apparatus 150 through external managing node 110, which operates as the access point or intermediary device that helps manage data and communications related to logistics operations (such as loading, unloading, or otherwise processing of a container) going to and coming from a container interface display apparatus 150. External managing node 110 is typically connected to container interface display apparatus 150 (shown deployed on the exterior wall of container 115) via wireless communications. However, those skilled in the art will appreciate that external managing node 110 and container interface display apparatus 150 may be implemented, in some other embodiments, to communicate via a wired connection between the respective devices.

In some embodiments, such as that shown in FIG. 1, container interface display apparatus 150 may be connected or otherwise in communication with an internal sensing device 120. Internal sensing device 120, as described in more detail below, is operative to detect or sense a condition within the container. In some embodiments, internal sensing device 120 may be implemented with one or more sensors deployed within the container (e.g., sensors that are configured and oriented to monitor a storage space within the container) and connected to container interface display apparatus 150 via a wired and/or wireless connection. However, in other embodiments, internal sensing device 120 may be complex enough to directly communicate with external managing node 110 (or in some embodiments, with user access device 140a as explained in more detail below) as a type of processor-based node device capable of wireless communication and having data gathering and processing capabilities onboard with a suite of different types of scanners and/or sensors.

In more detail, an embodiment of internal sensing device 120 may include one or more dimensioning depth sensors to scan or map a space exposed to the sensing element(s), such as a depth measurement of the storage space within container 115 relative to the location of the depth sensing element(s). Device 120 may operate as a camera or sensor type of device that senses distances and motion. Device 120 may be implemented as a simple dimension scanning device (depth sensing camera) or a device/array with multiple scanning elements that are each respectively aimed at different parts of the container's storage space, such as the space below a container's ceiling when the sensor is installed above the storage space. For example, device 120 may be an array having multiple scanning elements physically close to one another, yet each are respectively oriented and aimed to map and capture information on dimensions and depth in a different part of the storage space below a container's ceiling where items to be shipped are stored. In another example, device 120 may be implemented with separate sensor elements that are each, respectively, deployed along the container's sides and/or ceiling in a physically separated configuration of scanning elements that can be mounted along different points of the container (e.g., ceiling, walls, floor) so that the sensor elements of device 120 each map and capture information on dimensions and depth in a different part of the storage space below a container's ceiling or, more generally, from above the storage space of the container.

Further embodiments of internal sensing device 120, as described in more detail below, may deploy one or more types of other sensors within the container to help detect conditions within the container, such as an environmental condition (e.g., temperature, humidity, light, sound) within the container or detected changes in what is stored within the container (e.g., detected movement within the container, detected changes in the configuration of what is stored within the container).

An exemplary internal sensing device 120 may be implemented with a scanning sensor node as described in U.S. Provisional Patent Application No. 62/117,590 entitled "Enhancing Logistics Operations When Loading a Container Using a Scanning Sensor Node" by a common inventor as the present application and filed the same day as the present application. The details and supporting description of U.S. Provisional Patent Application No. 62/117,590 entitled "Enhancing Logistics Operations When Loading a Container Using a Scanning Sensor Node" is hereby incorporated by reference.

External managing node 110 and container interface display apparatus 150, in some embodiments, may also be connected to one or more user access devices 140, which may be used by logistics personnel (also referred to as a user, worker or operator) involved in a container related logistics operation. As described below in more detail, such a user access device 140 may be a display-enabled device that allows logistics personnel to receive messages (such as alert notifications related to an item 130*a* shipped in container 115) and/or provide user input. In other embodiments, those skilled in the art will appreciate that external managing node 110 may also be implemented as a portable, display-enabled device (similar to what is described herein as suitable for user access device 140), while still other embodiments may implement external managing node 110 as a fixed device and/or a device not having a graphic or display-enabled user interface with which to interact with logistics personnel.

In a further embodiment, the container interface display apparatus 150 may operate as a managing type of node with respect to the operation and interaction with an exemplary embodiment of internal sensing device 120. Thus, internal sensing device 120 may directly communicate sensor data to container interface display apparatus 150 and may indirectly communicate with other devices (e.g., user access device 140*c*, external managing node 110, and/or server 100) using apparatus 150 as an intermediary.

In general, an exemplary container (such as container 115) may be used to maintain one or more items (such as items 130*a*-130*e*) to be shipped or at least to be temporarily stored within container 115. Those skilled in the art will appreciate that an example container may include, but is not limited to, a unit load device (ULD), an intermodal shipping container, a semi-trailer pulled by a truck, a storage area within a train cargo car, a defined area in a delivery van, a bulk load area on an airplane, or a portion thereof. Such a container has at least one opening or entry through which it may be loaded or unloaded.

Figure 2:
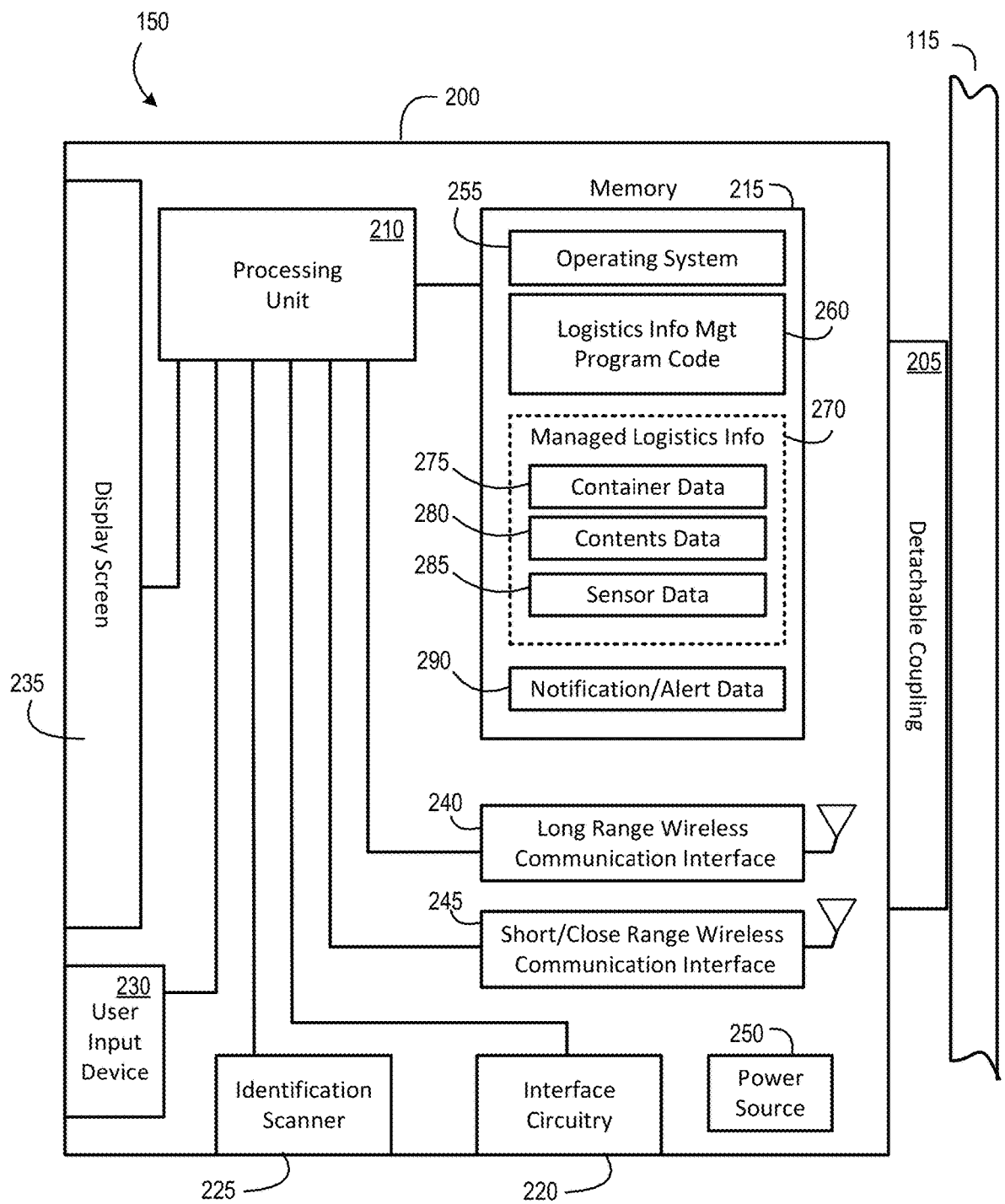
FIG. 2 is a more detailed diagram of an exemplary container interface display apparatus shown coupled to a container in accordance with an embodiment of the invention.

When loading an item into a container, a container interface display apparatus, such as apparatus 150, may be deployed on a particular container, such as container 115, to identify items being loaded and electronically display logistics information related to the container as part of an enhanced loading operation. An exemplary container interface display apparatus, such as apparatus 150, is generally a device capable of capturing, accessing, managing, displaying, and/or notifying others about managed logistics information related to a container and/or its contents. In a general embodiment, an exemplary container interface display apparatus 150 is a transceiver-based processing or logic unit that may be removably mounted on a wall of a container or, alternatively, be built into the container. In more detail, the exemplary container interface display apparatus may be implemented with a ruggedized housing; a radio(s) for wireless communications; onboard memory accessible by the processing unit for maintaining programming instructions and data; a scanner to identify items that are loaded into and unloaded out of the container; additional sensors; interfacing circuitry that may provide access to managed logistics information and/or allow further sensors to be connected, and a power source (e.g., a battery) that provides power for the circuitry of the container interface display apparatus. FIG. 2 provides further details of an exemplary container interface display apparatus, such as apparatus 150.

While exemplary container interface display apparatus 150 may provide access to onboard data and programming instructions via a physical connection to the interface circuitry, the container interface display apparatus 150 may also be in operative communication with external managing node 110 (or a user access device 140*c*) using a wireless connection through the radio on the container interface display apparatus. Exemplary external managing node 110 is typically deployed in an embodiment external to container 115 and operates as a type of intelligent intermediary access point or bridge between the back-end server 100 and the container interface display apparatus 150. In an embodiment, external managing node 110 may be connected to server 100 through network 105 via other wireless communications (which, depending on the desired deployment, can be the same or a different format than the wireless communications between a container interface display apparatus and an external managing node). However, those skilled in the art will appreciate that in another embodiment, external managing node 110 may be connected to server 100 through network 105 via a cable connection (such as an Ethernet connection or some other wired data communication connection).

In more detail, an exemplary external managing node 110 is a device having a processing or logic unit, a shorter range radio used for communicating with other devices (container interface display apparatus, other external managing nodes, and/or user access devices), a medium and/or long-range radio for communication with the server 100 or other devices, memory accessible by the processing unit, and a power source (e.g., a battery or a wired power supply connection) that provides power for the circuitry of the external managing node 100. An exemplary external managing node, such as external managing node 110*a*, may be positioned in a known fixed location or, alternatively, be a mobile unit that flexibly interacts with one or more container interface display apparatus as they come within range of the external managing node.

Those skilled in the art will appreciate that the processing unit of the external managing node 110 may include logic capable circuitry, such as a microprocessor or microcontroller, which generally performs computations on data and executes operational and application program code and other program modules within the external managing node 110. Those skilled in the art will also appreciate that exemplary master node 110*a* is a hardware-based component that may implement its processing unit with a single processor or logic unit, a more powerful multi-core processor, or multiple processors depending upon the desired implementation. In one embodiment, the processing unit of the external managing node 110 may be implemented with a low power microprocessor and associated peripheral circuitry that allows for wired and wireless communications on different communication paths via network 105 and wirelessly to other devices, such as exemplary container interface display apparatus 150. Less complex microcontrollers or discrete circuitry may be used to implement the processing unit of the external managing node 110 as well as more complex and sophisticated general purpose or dedicated purpose processors. However, while such hardware may be implemented with a general purpose or dedicated purpose processor, the functionality of the external managing node 110 as described herein within an embodiment is not merely convention when the embodiment is viewed as a whole and applied within the field of logistics and a cycle of logistics operations, such as loading, transporting, shipment processing, and unloading operations.

In yet another embodiment, an exemplary processing unit of the external managing node 110 may be implemented with a low power embedded processor as part of a single-board computer having a system-on-chip (SoC) device operating at its core. In this embodiment, the SoC device may include a removable memory card slot (e.g., a Secure Digital (SD) card slot) as removable memory, and flash memory operating as onboard non-volatile memory storage, RAM memory operating as onboard volatile memory, an operating system (such as Linux) stored on the non-volatile memory storage and running in volatile RAM memory, and peripherals that may implement the communication interfaces to network 105 and to other devices, such as container interface display apparatus 150 or user access device 140a or 140b.

Examples of such a communication interface may include specific communication circuitry for operatively coupling the external managing node 110 to a specific short-range communication path (e.g., a Bluetooth® Low Energy (BLE) connection path communicating at 2.4 GHz) that may be used for wireless communications with a container interface display apparatus. While BLE may be used in one embodiment to enable a short-range communication protocol, other embodiments may be implemented with other low power, short-range communication protocols, such as ultra-low power communication protocols used with ultra-wideband impulse radio communications, ZigBee protocols, IEEE 802.15.4 standard communication protocols, NFC, Ant+, and the like.

Exemplary external managing node 110 may further implement the communication interface with other communication circuitry that provides a medium and/or long-range communication interface portion to provide a communication path to server 100 via network 105. In one embodiment, such a longer range communication interface portion may be implemented with a medium range radio in the form of an IEEE 802.11g compliant Wi-Fi transceiver or a cellular radio. In yet another embodiment, both a Wi-Fi transceiver and a cellular radio may be used when best available or according to a priority (e.g., first attempt to use the Wi-Fi transceiver if available due to possible lower costs; and if not, then rely on the cellular radio). In other words, an embodiment may rely upon the longer range cellular radio part of such a communication interface as an alternative to the medium range Wi-Fi transceiver radio, or when the medium range radio is out of reach from a connecting infrastructure radio within network 105.

Additionally, an embodiment of external managing node 110 may provide a user interface to indicate status and allow basic interaction for review of data and relevant interactions with any other devices, such as container interface display apparatus 150, user access devices 140a and 140b, as well as server 100. In one embodiment, such a user interface may provide a display, interactive buttons or soft keys, and/or a pointing device to facilitate interaction with the display. In a further embodiment, a data entry device may also be used as part of the user interface. In still other embodiments, the user interface may take the form of one or more lights (e.g., status lights), audible input and output devices (e.g., a microphone and speaker), or touchscreen that may provide feedback to logistics personnel involved in loading operations. In yet another embodiment, the user interface may include a display where one or more images may be shown reflecting the container's contents or characteristics of conditions within the container (e.g., an image of the inside of the container, a depth map showing a density/volume of what is left to be filled within the container, a thermal display showing thermal variations within the container, a night vision or infrared image showing the inside of the container under low light conditions, a pressure map from the floor showing where the heaviest side of the container it, etc.).

While the embodiment illustrated in FIG. 1 shows only a single external managing node 110, those skilled in the art will appreciate that a networked system consistent with an embodiment of the invention may include a wide array of similar or different external managing nodes that each communicate with the server 100 and/or other external managing nodes, and a wide variety of similar or differently configured scanning sensor nodes and in some embodiments one or more user access devices. Thus, the exemplary networked system shown in FIG. 1 is a basic embodiment and those skilled in the art will appreciate that the system may further include such additional nodes and devices in further embodiments.

Exemplary network 105 in the system provides a type of interconnection and may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, network backbones comprised of graphene or other like materials embedded into materials of the container, etc.), wireless structures (e.g., antennas, receivers, modems, routers, repeaters, etc.) and/or a combination of both depending upon the desired implementation of a network that interconnects server 100 and other components shown in FIG. 1 and described above in one or more embodiments.

While exemplary server 100 is shown connecting through network 105, those skilled in the art will appreciate that server 100 may have more direct or dedicated connections to other components illustrated in FIG. 1, such as external managing node 110, depending upon implementation details and desired communication paths. Furthermore, those skilled in the art will appreciate that an exemplary server, such as server 100, may contain a collection of information in one or more databases (not shown in FIG. 1), while multiple databases maintained on multiple server platforms or distinct network storage servers may be used in other embodiments to maintain such a collection of information. Furthermore, those skilled in the art will appreciate that a database may be implemented with cloud technology that essentially provides networked storage of collections of information that may be directly accessible to devices, such as external managing node 110, as part of infrastructure supporting logistics operations.

In general, an embodiment of exemplary server 100 operates as a back-end type of platform that helps to manage the node devices (e.g., external managing node 110, container interface display apparatus 150), collect information from the nodes (e.g., weight and package count information regarding what is stored within a container), stores the collected information from the nodes or other information useful for the nodes in logistics operations (e.g., container shipping information), and may provide information about the nodes (e.g., node status, container status, container type information, sensor information, inventory, etc.) to requesting entities. Further details on various embodiments that take deploy an exemplary server and take advantage of this functionality are explained in more detail below.

Those skilled in the art will appreciate that exemplary server 100 is a hardware-based component that may be implemented in a wide variety of ways. For example, server 100 may use a single processor or may be implemented as one or more part of a multi-processor component that communicates with devices (such as user access device 140) and wireless nodes (such as external managing node 110).

An embodiment of server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), or a server farm that allows multiple distinct components to logically function as one server computing platform device from the perspective of a client device (e.g., external managing node 110). And exemplary server 100 may deploy more than one memory storage media, and may include memory storage media in differing non-transitory forms (e.g., conventional hard disk drives, solid state memory such as flash memory, optical drives, RAID systems, cloud storage configured memory, network storage appliances, etc.).

At its core, exemplary server 100 comprises at least a processing or logic unit coupled to a network interface, which facilitates and enables operative connections and communications through network 105 with at least one or more external managing nodes and, in some embodiments, user access devices, such as device 140b. In one embodiment, server 100 may include a medium and/or long-range radio communication interface with which to more directly communicate with one or more external managing nodes, such as node 110. Using these communication paths as well as programming instructions stored in the server's memory and executed by the server's processing unit to collectively provide the described unconventional functionality, the server 100 generally operates to coordinate and manage information related to logistics operations for a container coupled to a container interface display apparatus 150, which facilitates gathering, managing, and providing logistics information regarding the container.

In some embodiments, server 100 may include a database or other data storage media that provides and stores container level information (such as container type registry information, container dimensional information, container shipping information) as well as maintains item level information on what is stored within a container (such as association data, weight data, item shipping information, and the like). The container level information and item level information related to a specific container is typically accessible to server 100 and may be updated by server 100 as well as other devices that gather and notify server 100 regarding such updated information for a particular container. As will be described in more detail, an example of such an update to server 100 may take the form of a content related notification that may originate with a container interface display apparatus 150 as a type of alert message that proactively informs the server 100 about a type of notification event (such as a particular status of the container).

In some embodiments described in more detail below, external managing node 110 may respond to a notification message from container interface display apparatus 150 by transmitting a message to server 100 so as to update logistics information related to container 115 maintained in the database. Server 100 may then communicate with devices in the networked system as shown in FIG. 1 to transmit or otherwise issue a type of logistics operation message in response to the message from external managing node 110. Such a logistics operation message may implement changes to loading, processing, shipment, unloading, or other logistic operations related to container 115. For example, such a logistics operation message may have server 100 updating a delivery entity responsible for anticipated custody of some or all of what is stored in container 115 so as to facilitate more efficient logistics operations regarding such content. Those skilled in the art will appreciate that when updating the delivery entity, server 100 may communicate with other devices not expressly shown in FIG. 1 for purposes of clarity, which may include a delivery service entity managing node apparatus (e.g., a device similar to external managing node 110), a delivery service entity back-end server (e.g., a device similar to server 100), and a delivery service entity user access device used by logistics personnel associated with the delivery service entity (e.g., a device similar to user access devices 140a-140c).

As noted above and shown in the embodiment of FIG. 1, user access devices 140a-c may connect with and/or through external managing node 110 to interact with container interface display apparatus 150 or server 100. In some embodiments, a user access device, such as device 140b, may connect and communicate with server 100 through network 105. In still other embodiments, a user access device, such as device 140c, may connect and communicate directly with container interface display apparatus 150. In general, an exemplary user access device, such as devices 140a-140c, allow a user (such as a logistics worker or operator participating in a logistics operation) to interact with one or more components of the networked system of FIG. 1. More specifically, exemplary user access devices 140a-140c may operate as a type of node element within the networked system of FIG. 1 and may be used by logistics personnel involved in a logistics operation to receive input from and/or to provide logistics information to the logistics personnel relative to operation involving container 115 and its contents (e.g., displaying information related to the status of the container, package count within the container, the weight data regarding what is stored within the container, shipping information regarding what is stored within the container, and the like).

In various embodiments, exemplary user access device 140 may be implemented using a desktop computer, a laptop computer, a tablet (such as an Apple iPad® touchscreen tablet), a personal area network device (such as a Bluetooth® device), a smartphone (such as an Apple iPhone®), a smart wearable device (such as a Samsung Galaxy Gear™ smartwatch device, or a Google Glass™ wearable smart optics) or other such devices capable of communicating with container interface display apparatus 150, external managing node 110 and/or over network 105 with server 100, over a wired or wireless communication path to such networked system elements. An exemplary user access device, such as device 140, may include sufficient hardware and program code (e.g., an app or other program code section or sections) to operate as a node element in various embodiments as discussed in more detail below. For example, device 140b may be implemented as a mobile smartphone or ruggedized tablet device used by a particular delivery service entity (e.g., FedEx® Express, FedEx® Ground, and the like) and functionally may operate to receive logistics operation messages and notifications and information related to operational processing and shipment cycles for container 115. In one embodiment, such ruggedized equipment that may operate as an exemplary user access device 140 may be implemented with a Symbol TC70 rugged handheld computer from Zebra Technologies (previously provided by Motorola Solutions) having a touchscreen that can accommodate wet fingers, gloves, or a stylus and runs on the Android KitKat operating system. Other examples of devices that may operate as types of user access devices may include handheld devices (e.g., a Model TC75 handheld terminal from Zebra Technologies, a Model FZ-X1 rugged table from Panasonic, a Model CN70e ultra-rugged mobile computer from Intermec, a Model CV61 vehicle mounted computer), portable printing devices from Toshiba Corporation, fixed printing devices from Zebra Technologies, as well as scanning devices from Zebra Technologies and Intermec.

Thus, as shown in FIG. 1, an exemplary container interface display apparatus, such as apparatus 150, may operate as a node element within a networked system that operates to improve and enhance the efficiency of a logistics operation involving a container, such as container 115. And while FIG. 1 shows a container interface display apparatus coupled to a container, those skilled in the art will appreciate that leveraging such an exemplary container interface display apparatus may be scalable to larger applications and different types of containers. For example, further embodiments may involve a physically large container that may use multiple container interface display apparatus deployed at different positions on the same large container as needed to appropriately identify items loaded into the storage space of the container and present appropriate portions of managed logistics information related to the container at the different position on the container (e.g., on a wall near each of multiple access points to the container (such as a side entrance and a rear entrance of a trailer container) or as deployed within the container near particular defined storage spaces within the container).

Further details of the architecture and components of an exemplary container interface display apparatus are described in more detail below. In particular, FIG. 2 is a more detailed diagram of an exemplary container interface display apparatus shown coupled to a container in accordance with an embodiment of the invention. Referring now to FIG. 2, exemplary container interface display apparatus 150 is generally a device operative to manage logistics information relative to a container and what is stored within the container, as well as generate an electronic display of relevant or selective portions of such information to advantageously facilitate logistics operations involving the container (e.g., loading, processing, shipping, unloading of the container). The container interface display apparatus 150 may be used to help capture certain of the managed logistics information and, in some embodiments, provide alert type notifications regarding the container and/or its contents in order to enhance the efficiency of logistics operations related to the container.

As illustrated in FIG. 2, exemplary container interface display apparatus 120 may be implemented as a device having a housing 200, which is configured to mount to the container, such as mounted to an exterior wall of container 115. In the illustrated embodiment, housing 200 is attached to a wall of container 115 by means of a detachable coupling 205. Housing 200 may be implemented, for example, with ingress protected rugged structure and material to allow container interface display apparatus 150 to operatively survive a harsh environment, such as being resistant or otherwise protected against dust, moisture, temperature, and/or physical drops of the apparatus 150 should the apparatus 150 unintentionally detach from the container 115 or otherwise be dropped during a logistics operation related to container 115.

In the illustrated embodiment of FIG. 2, the exemplary coupling 205 of the housing 200 and the wall of container 115 may be temporary in order to allow exemplary container interface display apparatus 150 to be easily installed on container 115 but also be easily removed if/when desired. Coupling 205 may, for example, be removable or temporarily attached to the wall of container 115 by means of a magnetic connection or a pressure sealing adhesive that allows for placement and later detachment of the housing 200. As such, an embodiment may implement exemplary coupling 205 with temporary attachment structure (e.g., one or more magnets, adhesive, Velcro® hook & loop fastening material, one or more physical clips, one or more quick connect thumbscrews and threaded mating holes). Such temporary attachment structure may be engaged and disengaged to allow for a quick connect and disconnect of the housing 200 and the wall of the container 115. For example, in an embodiment, a connection base portion (not shown) of the coupling 205 may be temporarily or permanently mounted to or formed into a desired location on a wall or other part of container 115 while a second portion of the coupling 205 may be mounted to or formed into housing 200 so that it may mate with the connection base portion.

In more detail, detachable coupling 205 may use fitted or mated structure (such as keyseated mating parts of coupling 205). In this manner, one part may be fixed or attached to the housing 200 while the other part may be fixed or otherwise attached to the wall of container 115 in such a way to ensure the container interface display apparatus 150 is placed and oriented in a desired physical attitude and orientation when the coupling's mated parts are seated to each other.

And while shown in FIG. 2 as a detachable coupling, an alternative embodiment may have coupling 205 not necessarily detachable and, instead, have coupling 205 as part of a more permanent connection or attachment mechanism. For example, coupling 205 may fix housing 200 to container 115 such that container interface display apparatus 150 thereon remains fixed to the container 115 as a type of built-in electronic label type of device. As such, container interface display apparatus 150 may operate as part of container 115 as described herein albeit in a configuration where the container interface display apparatus 150 becomes associated with container 115 as the container 115 is loaded/unloaded, processed, moved, transported, and shipped in its intended manner (e.g., via aircraft or other modes of transportation).

As illustrated in FIG. 2, an embodiment of exemplary container interface display apparatus 150 is a hardware-based component implemented with a processor or logic unit, such as processing unit 210, coupled to onboard memory 215. Exemplary container interface display apparatus 150 generally comprises one or more wireless interfaces 240 and 245, interface circuitry 220, an identification scanner 225, user input device 230, display screen 235, and a power source 250. Those skilled in the art will appreciate that a further embodiment of exemplary container interface display apparatus 150 may also include additional onboard sensors (similar to those included in internal sensing device 120 as described above).

In more detail, exemplary wireless interfaces 240 and 245 are each coupled to the processing unit 210 and allow for longer range wireless communications (via interface 240) and for shorter range wireless communications (via interface 245). Each of these wireless interfaces may generally be implemented as a programmable radio and an omni-directional antenna coupled to the processing unit 210 where the radio communicates through the antenna with other devices (such as that shown in FIG. 1). In an embodiment, interfaces 240 and 245 may use an antenna with a different antenna profile when directionality may be desired or particular communication frequencies call for a different antenna configuration. Exemplary wireless interfaces 240 and 245 may communicate using various different types of radio transceivers for different types of communications, such as a Bluetooth® interface or wireless network interface (Wi-Fi) for the short/close range wireless communications interface 245 or a cellular interface for the longer range wireless communications interface 240. Those skilled in the art will appreciate that in further embodiments, interfaces 240 and 245 may implement an RFID reader and/or NFC communications, or other data communications interface that allows for wireless communication. For example, LoRa™ wireless products from Semtech Corporation of Camarillo, Calif. may be used in embodiments as a low-cost way to enable such wireless communication. In other embodiments, a single interface may be used as both interfaces 240, 245 when desired communications may be accomplished with a range of a single interface.

As noted above, an embodiment may have multiple container interface display apparatus mounted relative a single container, such as when the container has multiple entries where items may be loaded and unloaded and through which logistics personnel may be expected to move. Those skilled in the art will appreciate that the wireless interfaces 240 and 245 deployed within each of the container interface display apparatus may allow for node-to-node communications between two container interface display apparatus. For example, one container interface display apparatus may operate as a managing node in that it may receive messages and/or data from another container interface display apparatus and pass the received messages and/or data along to an external managing node, such as external managing node 110. This may be helpful when only one of the container interface display apparatus is within communication range of the external managing node, but the other scanning sensor node is unable to directly communicate with the external managing node. Furthermore, in such a multiple container interface display apparatus embodiment involving a single container, the different container interface display apparatus may operate similarly relative to managing logistics information related to the particular container and provide respectively relevant portions of the managed logistics information as displayed electronic logistics monitor information on the respective display screen 235 of each apparatus.

Interface circuitry 220 may generally be deployed on container interface display apparatus 150 to operatively couple apparatus 150 to one or more devices external to apparatus 150. In an embodiment, interface circuitry 220 may provide a connection on housing 200 that is available for operative interactions with modular components external to housing 200 that may further expand the functionality of apparatus 150. For example, the connection implemented with interface circuitry 220 may allow a scale disposed within a container to be in communication with the processing unit 210 of apparatus 150. Likewise, interface circuitry 200 may allow apparatus 150 to receive information from other sensors (e.g., sensing elements of internal sensing device 120) on environmental conditions within and relative to container 115. Such other sensors may include, for example, a motion sensor that detects movement within the container as the environmental condition; a light sensor that detects a threshold level of light within the container as the environmental condition; a temperature sensor that detects a threshold level of temperature within the container as the environmental condition; a humidity sensor that detects a threshold level of humidity within the container as the environmental condition; a kinetic force sensor that detects a concussive or impact force related to the container as the environmental condition; a chemical sensor that detects an atmospheric chemical composition change within the container as the environmental change; a location sensor that detects location coordinates, such as Global Positioning System (GPS) coordinates, relative to the geographic location of the container; a microphone that detects an auditory level change related to the container as the environmental change; a pressure sensor that detects a barometric pressure within the container as the environmental change; and a smoke sensor that detects a smoke particle concentration within the container as the environmental change. Further exemplary sensors may detect a disruption in a communication environment (e.g., Wi-Fi connection lost, RF signal strength detector/indicator, and the like) as a type of environmental condition.

In a further embodiment, an exemplary sensor may be implemented with a type of image sensor or camera sensor that is operative to capture one or more images that reflect the interior or portions of the interior of the container. Such a sensor may generate period still images, thermal images, video images, or other types of filtered or enhanced images that reflect the contents of the container and provide information about the status of the container and its contents. For example, an exemplary camera or image sensor may generate an image of the inside of the container, a depth map showing a density/volume of what is left to be filled within the container, a thermal display showing thermal variations within the container, a night vision or infrared image showing the inside of the container under low light conditions, a pressure map from the floor showing where the heaviest side of the container it, etc. Thus, an embodiment of interface circuitry 200 may allow apparatus 150 to receive information from sensors (e.g., sensing elements of internal sensing device 120) on conditions within and relative to container 115 without having to open container 115.

Interface circuitry 200 may also be coupled to one or more sensors that identify a type of container based on container information, such as a detected barcode or detected dimensional information associated with the container. For example, a depth sensor or other sensors within internal sensing device 120 may be operatively coupled to apparatus 150 as another type of identification sensor or scanner operative to detect information that identifies the particular container (e.g., container type registry information such as dimensional baseline information on the available storage area within container 115, barcode information associated with container 115, and the like) or conditions related to or within the container related to the storage space and items maintained in such space.

In more detail, an embodiment of interface circuitry 220 may connect to the processing unit 210 to generally provide an external interface to elements onboard container interface display apparatus 150. Such interface circuitry 220 may, for example, comprise various peripherals (e.g., timer circuitry, USB, USART, general-purpose I/O pins, IR interface circuitry, DMA circuitry) that implement an interface (e.g., a plug type or connectorized interface on housing 200) with different external sensors or other circuitry/devices external to container interface display apparatus 150. In another embodiment, interface circuitry 220 may operate to provide a data interface (such as a micro USB interface) that gives an external device access to data and code kept in the memory 215 or allows the external device to provide other data and/or code to be stored within the memory 215 of container interface display apparatus 150. In another embodiment, interface circuitry 220 may be implemented to include a memory card interface, such as a micro Secure-Digital (SD™) memory card slot and supporting circuitry, so that non-transitory removable memory media storage in the form of a memory card may be accessible to processing unit 210.

The identification scanner 225 on exemplary apparatus 150 is generally one or more sensors or scanning elements that identify an item being loaded within the container 115 or identify the container itself. In more detail, scanner 225 may operate to read or receive identification information related to an identification element. Such sensing or scanning elements may, for example, perform scanning with electrical signals (e.g., radio waves), lasers, and other optical, electro-optic, magnetic, or electro-magnetic signals. An exemplary sensing or scanning element may include, but is not limited to, a barcode scanner, a radio frequency identification (RFID) reader, a near field communications (NFC) interface, Bluetooth® radio, or other wireless network data communications device, and the like that may operate to read or receive identification information related to an identification element. Such an exemplary sensing or scanning element of scanner 225 may be implemented with other low power, short-range communication devices that may use communication protocols, such as ultra-low power communication protocols used with ultra-wideband impulse radio communications, ZigBee protocols, IEEE 802.15.4 standard communication protocols, and the like. An exemplary identification element may include a barcode label that may be a read by a barcode scanner. Other types of wireless identification elements may be implemented as, for example, an RFID tag, an NFC device, an Ant+ device, another Bluetooth® device, a ZigBee device, or another wireless network data communications device operating under a similar communications format as the scanning element. Thus, an embodiment of identification scanner 225 may be implemented as a type of identification scanning or listening device that conducts a scan (e.g., sends out a signal or beam, or listens for a signal or reflected beam) to receive information related to the item being shipped as a way of identifying the item.

User input device 230 on an embodiment of container interface display apparatus 150 may allow a user, worker, or logistics personnel to input relevant or prompted input to apparatus 150. For example, such input may selectively alter what is presented, displayed, or transmitted by apparatus 150 as managed logistics information related to the container 115 (e.g., package count data, weight data, shipping data, sensor data, delivery related data, alert notification information, and electronic scannable barcode object(s) related to container 115 and what it is presently storing). In one embodiment, user input device 230 may provide interactive buttons, switches, or soft keys, and/or a pointing device to facilitate operations of apparatus 150. Example of such operations may include, but are not limited to, activation/deactivation of apparatus 150, controlling screen properties such as brightness or sleep mode relative to display screen 235, modifying the managed logistics information related to the container, or otherwise providing input relative to what is stored within the container. In a further embodiment, a data entry device may also be used as part of the user input device 230. In still other embodiments, the user input device 230 may take the form of audible input and output devices (e.g., a microphone and speaker) that provide or gather relevant feedback to and from logistics personnel involved in container logistics operations (e.g., beeps or warning buzzers that may help attract the attention of the relevant logistics personnel).

The display screen 235 of exemplary container interface display apparatus 150 generally provides electronic logistics monitor information to logistics personnel involved in container logistics operations. In general, such electronic logistics monitor information may include some or all of the managed logistics information related to the container attached to apparatus 150, and may indicate a status of container interface display apparatus 150 or operational controls for apparatus 150. In a more detailed embodiment, display screen 235 may be of a desired size, such as between 3.5 and seven inches in a vertically or horizontally oriented 9×6 aspect ratio, for a worker or logistics personnel to be able to read information shown in display screen 235 and be able to electronically scan objects that may be shown on display screen 235 (e.g., an electronically generated barcode image that is suitable for scanning or reading by a separate barcode reader or scanner). Thus, display screen 235 may present label information plus additional information related to a container and/or its contents that may be in the form of one or more scannable objects (such as a barcode).

An embodiment of display screen 235 may be a touch-screen device readable in both brightly lit and dimly lit areas, may be implemented with ingress protection rated for dust and precipitation resistance, and make use of a combination of capacitive and/or resistive input. An embodiment of display screen 235 may include physical and/or virtual buttons on the screen bezel and/or on the perimeter of a frame for display screen 235 that may be used for functions similar to those described above with user input device 230. In other words, an embodiment of display screen 235 may incorporate elements of user input device 230 so that a combined element (such as a touchscreen) may be used to implement both. Embodiments of display screen 235 may support a variety of technologies such a high resolution pixel count or lower-end monochrome solutions (e.g., electronic paper display (EPD) modules that use electronic ink micro-capsules, such as that provided by E Ink Corporation) that help extend battery life and facilitate acceptable readability in various environmental conditions.

Thus, those skilled in the art will appreciate that display screen 235, user input device 230, and interface circuitry 220 may be deployed to implement a variety of feedback mechanisms for the user via, for example, visual output, audio output, haptic (vibration) feedback. Such feedback may be provided through such elements (as well as through notifications generated and/or transmitted to other devices) so that the user or other personal may be made aware of notable events related to the container, conditions within the container, and/or contents of what is stored within the container.

Exemplary container interface display apparatus 150 further includes power source 250. As shown in FIG. 2, power source 250 is a component of container interface display apparatus 150 that provides power for the various active circuitries deployed within the container interface display apparatus 150. An embodiment of power source 250 may be a rechargeable or replacement power element (e.g., a replaceable battery unit or cell, a chargeable battery unit or cell, or a chargeable battery coupled to a solar cell that may operatively charge the battery). In some embodiments, the solar cell may be disposed on an exterior of housing 200 so that container interface display apparatus 150 may be recharged via sunlight.

In another embodiment, power source 250 may be charged wirelessly via proximity to a charging station, such as a charging pad, that may provide power to a charging device (not shown) connected to interface circuitry 220 or integrated as part of power source 250. In more detail, power source 250 may be wirelessly charged using a charge-transmitting unit that broadcasts a targeted RF signal to a charge-receiving device connected to interface circuitry 220 (or to a wireless charge-receiving circuitry integrated as part of power source 250). Such an exemplary charge-transmitting unit may be deployed as part of a container, a vehicle that may temporarily or permanently include a container (e.g., aircraft, truck, delivery van), or a logistics facility that processes a container in order to facilitate charging power source 250 in a wireless, efficient, and timely manner without relying on corded charging of power source 250. In yet another embodiment, power source 250 may be implemented as an exemplary wireless charge-receiving device when the power demands of apparatus 150 can be sufficiently supplied by such a wireless charge-receiving device. Examples of such wireless charging circuitry and systems that may be deployed to help charge power source 250 include WattUp™ power router and enabled receivers from Energous Corporation of San Jose, Calif.; Cota® wireless power solutions from Ossia, Inc. of Redmond, Wash.; and Powermat® wireless charging technology from Powermat Technologies Ltd. of Neve Ilan, Isreal.

Relative to processing unit 210, those skilled in the art will appreciate that exemplary processing unit 210 is essentially logic that generally performs computations on data (such as exemplary data 270-290) and executes operational and application program code (such as operating system 255 and application program code module 260) within the container interface display apparatus 150. As such, exemplary processing unit 210 operates as the processing core of container interface display apparatus 150. In one embodiment, processing unit 210 may be implemented with processing and associated peripheral circuitry as dictated by the needs of the particular applied embodiment, such as a low power consumption microcontroller. Less complex microcontrollers or discrete circuitry may also be used to implement processing unit 210, as well as more complex and sophisticated microprocessors.

Those skilled in the art will appreciate that exemplary processing unit 210 may be integrated into a single chip transceiver or SoC used as a core of container interface display apparatus 150. Those skilled in the art will also appreciate that container interface display apparatus 150 may be implemented with specially optimized hardware (e.g., a particular application specific integrated circuit (ASIC) having the same operational control and functionality as the application program code module 260, as described below), discrete logic, or a combination of hardware and firmware depending upon requirements of the container interface display apparatus 150, such as power, processing speed, size of the container space to be scanned, etc.

To support display screen 235, an embodiment of processing unit 210 is operative to generate signals and appropriately drive the circuitry within display screen 235. In further embodiments, those skilled in the art will appreciate that processing unit 210 may be implemented with a general processing chipset and a separate graphics processing unit (GPU) and video memory to appropriately handle the desired graphics capability of an embodiment of apparatus 150.

In a further detailed embodiment, exemplary processing unit 210 may be implemented by a low power ARM1176JZ-F application processor used as part of a single-board, low cost, small footprint computer, such as the Raspberry Pi Computer Model B+ or A+. In one embodiment, the ARM application processor is embedded within a Broadcom® BCM2835 system-on-chip (SoC) deployed in the Raspberry Pi Computer. In this embodiment, the Raspberry Pi Computer device operates as a core of exemplary container interface display apparatus 150 and includes a Secure Digital memory card slot and flash memory card operating as memory storage 215, a 512 Mbyte RAM memory storage operating as volatile memory, an operating system (such as Linux), and peripherals that implement at least interface circuitry 220 and may drive display screen 235. Other exemplary implementations of processing unit 210 and circuitry within apparatus 150 may use a particular model of Arduino™ single-board computer that is operative to receive inputs from sensors and control other devices.

In a general embodiment, the onboard memory 215 on container interface display apparatus 150 is accessible by processing unit 210 for maintaining program code and data. A part of memory 215 may be implemented as a tangible, non-transient computer readable medium on which information (e.g., executable code/modules and data) may be kept in a non-volatile and non-transitory manner. Examples of such memory storage may include a hard disk drive, ROM, flash memory, or other media structure that allows long term, non-volatile storage of information. Such memory storage maintains a program code (e.g., operating system 255, logistics information management program code 260) and other data elements (e.g., managed logistics information 270 (such as container data 275, contents data 280, and sensor data 285), notification/alert data 290, and the like).

Another part of memory 215 may be implemented as random access memory (RAM) structure used by processing unit 210 during operation of the container interface display apparatus 150. Upon power up of apparatus 150, the volatile memory part of memory 215 may be populated with operating system 255 and then with one or more operational programs (such as logistics information management program code 260) or specific program modules that help facilitate particular specially adapted and unconventional operations of container interface display apparatus 150. During operation of container interface display apparatus 150, the volatile memory may also include certain data (e.g., managed logistics information 270 (such as container data 275, contents data 280, and sensor data 285), notification/alert data 290, and the like) generated as the container interface display apparatus 150 executes instructions as programmed or loaded from the non-volatile memory storage part of memory 215. However, those skilled in the art will appreciate that not all data elements illustrated in FIG. 2 must appear in memory 215 at the same time.

In an embodiment, exemplary program code (e.g., logistics information management program code 260) is a set of executable instructions in the form of one or more machine-readable program code modules or applications. The program code module(s) may be loaded and executed by processing unit 210 to adapt the processing unit 210 into a specially adapted and configured computing-based apparatus. This specially configured processing unit 210 of apparatus 150, as described in more detail herein as a part of an embodiment, implements operative process steps and provides functionality that is unconventional, especially when the process steps are considered collectively as a whole. Such a specially adapted and configured processing unit 210 helps, as a part of an embodiment, to address and improve targeted and technical problems faced in logistics operations related to a container as described in more detail below.

In particular, exemplary logistics information management program code 260 provides executable instructions that generally enable the container interface display apparatus 150 to manage logistics information related to a container, as described in more detail below with respect to FIG. 5. Another embodiment of logistics information management program code 260 may provide executable instructions that generally enable the apparatus 105 to advantageously manage logistics information related to a container having a scale, as described in more detail below with respect to FIGS. 6A and 6B. Still another embodiment of logistics information management program code 260 may provide executable instructions that generate a content related notification based upon a container's managed logistics information, as described in more detail below with respect to FIG. 7.

As previously noted, in addition to operating system 255 and program code 260, memory 215 may maintain and rely upon different types of data and data structures during operations of an exemplary container interface display apparatus 150. Data in memory 215 may be generated by container interface display apparatus 150 or may be received from other devices (such as external managing node 110, user access device 140c, or a memory card accessed through interface circuitry 220). In more detail, such exemplary data generated and/or maintained in memory 215 may comprise at least managed logistics information 270 (such as container data 275, contents data 280, and sensor data 285) and notification/alert data 290. Such data may be kept in memory 215 and, when available and desirable, transmitted to other devices, such as external managing node 110, which may further provide such data to back-end server 100. Back-end server 100 may, in some embodiments, share parts of such data as individual, substantially real-time item-level information to end customers related to the particular item being shipped. An embodiment may have apparatus 150 using short/close range wireless communication interface 245 to share such data with a user access device, such as device 140c shown in FIG. 1.

In general, managed logistics information 270 may include container-level information related to the particular container and item-level information specifically related to respective items stored within the container. An embodiment of managed logistics information 270 may include information generated by apparatus 150, information received from other devices (such as external managing node 110, user access device 140c, and/or server 100), and a combination thereof.

In an embodiment, container data 275 is a type of container-level information of managed logistics information 270. Container data 275 may, for example, generally include information identifying the container. For example, container data 275 may include container type registry information or other container identification information that identifies the type of the container and may provide associated baseline dimensional information related to the space within the container that helps identify the container type. Container data 275 may include container location information that reflects location coordinates (e.g., GPS coordinates) of the container when an embodiment of apparatus 150 includes a GPS chipset (not shown in the embodiment illustrated FIG. 1) coupled to processing unit 210. Container data 275 may include an inventory of what is currently stored within the container and may include a package count of how many items are collectively and currently stored within the container. Container data 275 may also include container shipping information related to, for example, how the container is to be shipped, where the container is being shipped, and other delivery related parameters relative to the container (e.g., a delivery date for the container, a delivery time for the container, a delivery shipment category for the container, a delivery service identifier for the container, and a delivery mode identifier for the container).

Contents data 280 is a type of item-level information of managed logistics information 270. Contents data 280 may, for example, generally include information identifying what is stored within the container. For example, contents data 280 may include association data that reflects a tracked and managed association relationship between the container and each item loaded within the container; weight data on the weight of each item loaded within the container; and location data regarding where to find some or all of the items loaded within the container or how to load particular items into specific areas within the storage space of the container (which may be very useful for a courier operating user access device 140c and needing to find a particular item within container 115 for unloading and delivery to a customer).

Exemplary contents data 280 may also include item shipping information associated with respective items within the container. Such item-specific information may include delivery related parameters for a particular item, such as a delivery date for the item (e.g., Saturday delivery), a delivery time for the item (e.g., morning delivery, prior to 10 am, and the like), a delivery shipment category for the item (e.g, overnight, priority, same day, etc.), a delivery service identifier for the item (e.g., delivery by FedEx® Express, FedEx® Ground), a delivery mode identifier for the item (e.g., courier personnel, autonomous vehicle, etc.), and special handling identification information for the item (e.g., an indicator or identifier that special instructions will apply to the container given what the item is). In more detail, special handling information may identify the item as a type of dangerous good or hazardous material where the container having the item must, for example, be placed in a certain position on the transport. For example, such exemplary special handling information may indicate the item is a live animal and containers with animals maintained within the container may be required to be in a special part of the transport with regulated temperature and atmospheric conditions so that the animal remains alive and well treated while on the transport.

Sensor data 285 is another type information in managed logistics information 270 that may, for example, generally include information related to what is detected or sensed by apparatus 150 (including separate sensing devices connected to apparatus 150). For example, sensor data 285 may include data reflecting dimensional information on the storage space of the container; detected environmental conditions related to or within the container (such as a sensor detected level of light within the container, temperature within the container, humidity within the container, concussive force related to the container, atmospheric chemical composition change within the container, auditory level change related to the container, barometric pressure within the container, and/or smoke particle concentration within the container); raw weight data from a scale within the container; and data detected or sensed by identification scanner on a barcode or wireless identification element associated with an item loaded within the container.

In an embodiment, notification/alert data 290 is generally a type of data used when the container interface display device generates and/or transmits a notification or other alert related type of message to another device, such as the external managing node 110 or user access device 140c. For example, the notification/alert data 290 may include message data to be sent to other devices to update managed logistics information stored and maintain higher up within a networked logistics system (e.g., as stored on external managing node 100 and/or server 100). In another example, the notification/alert data 290 may include information on a notification event related to an item stored within the container as well as a content related notification generated by apparatus 150. Information about a content related notification may be shown on display 235 and/or transmitted as a type of notification message to other devices, which may respond by generating and transmitting further logistic operation messages, such as an update notification related to a particular item.

Those skilled in the art will appreciate that the above identification of particular program code 260 and data 270-290 are not exhaustive and that embodiments may include further executable program code or modules as well as other data relevant to operations of a specially programmed processing-based device, such as an exemplary container interface display apparatus 150.

Figure 3B:
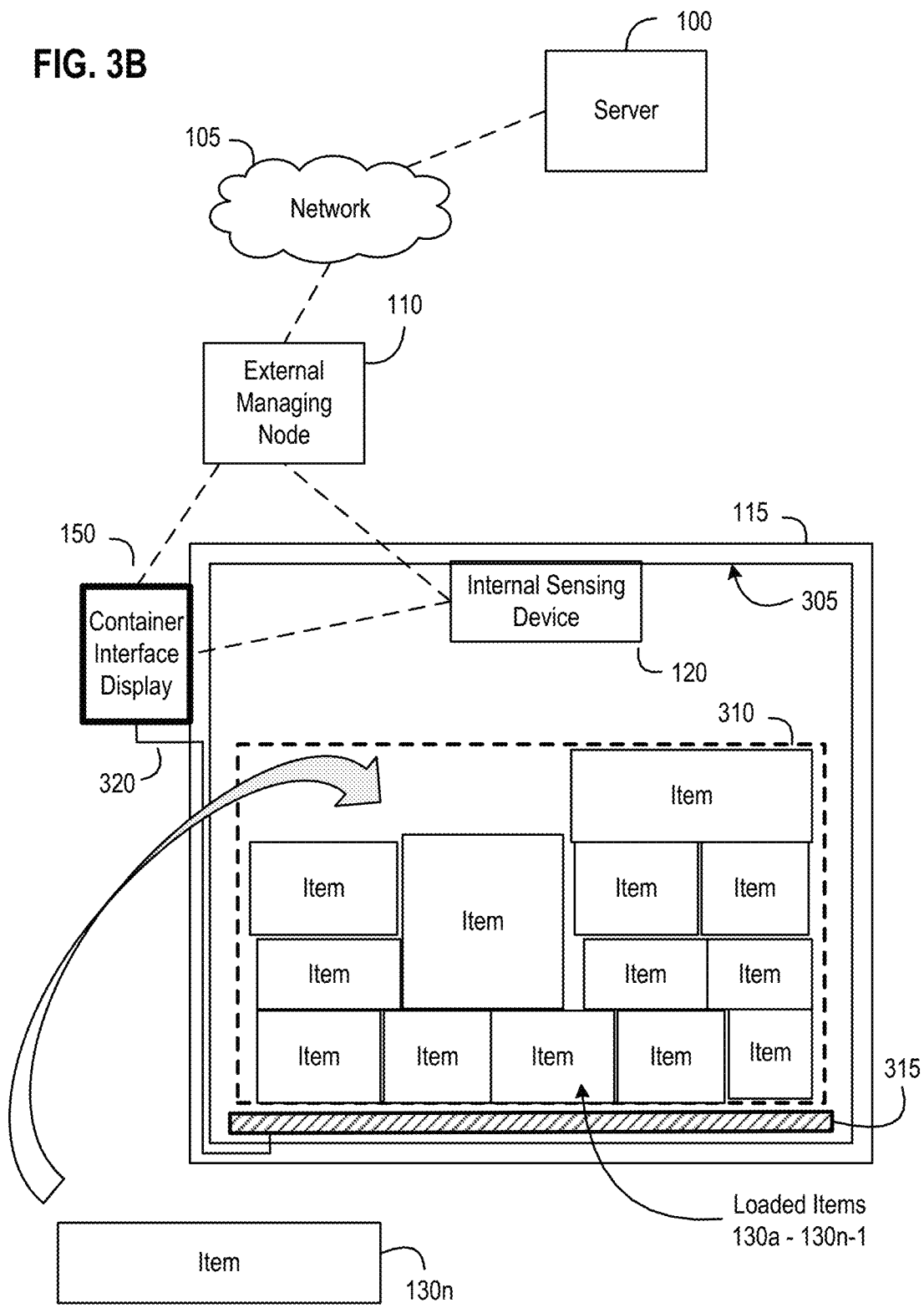
Figure 3C:
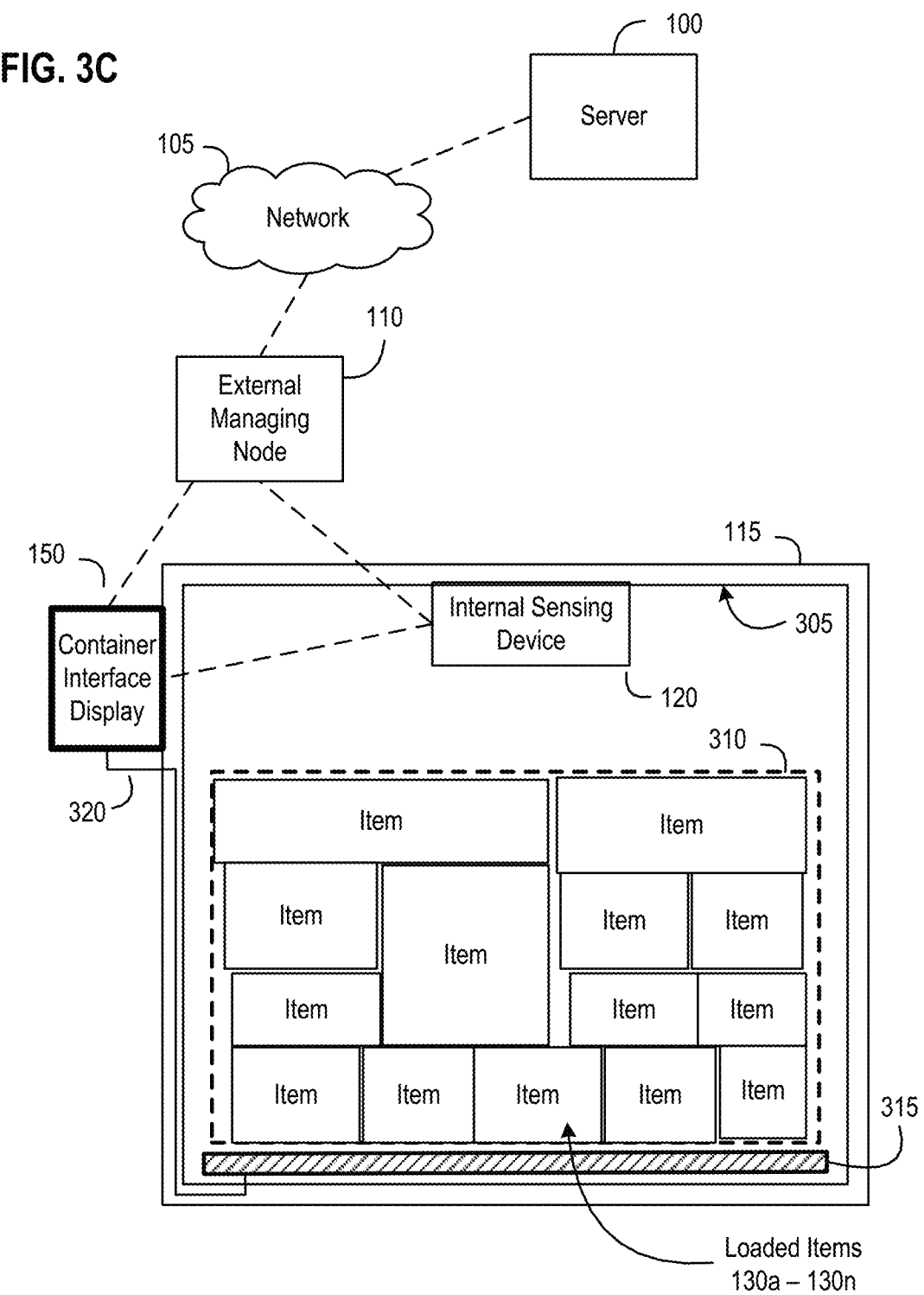
Figure 4B:
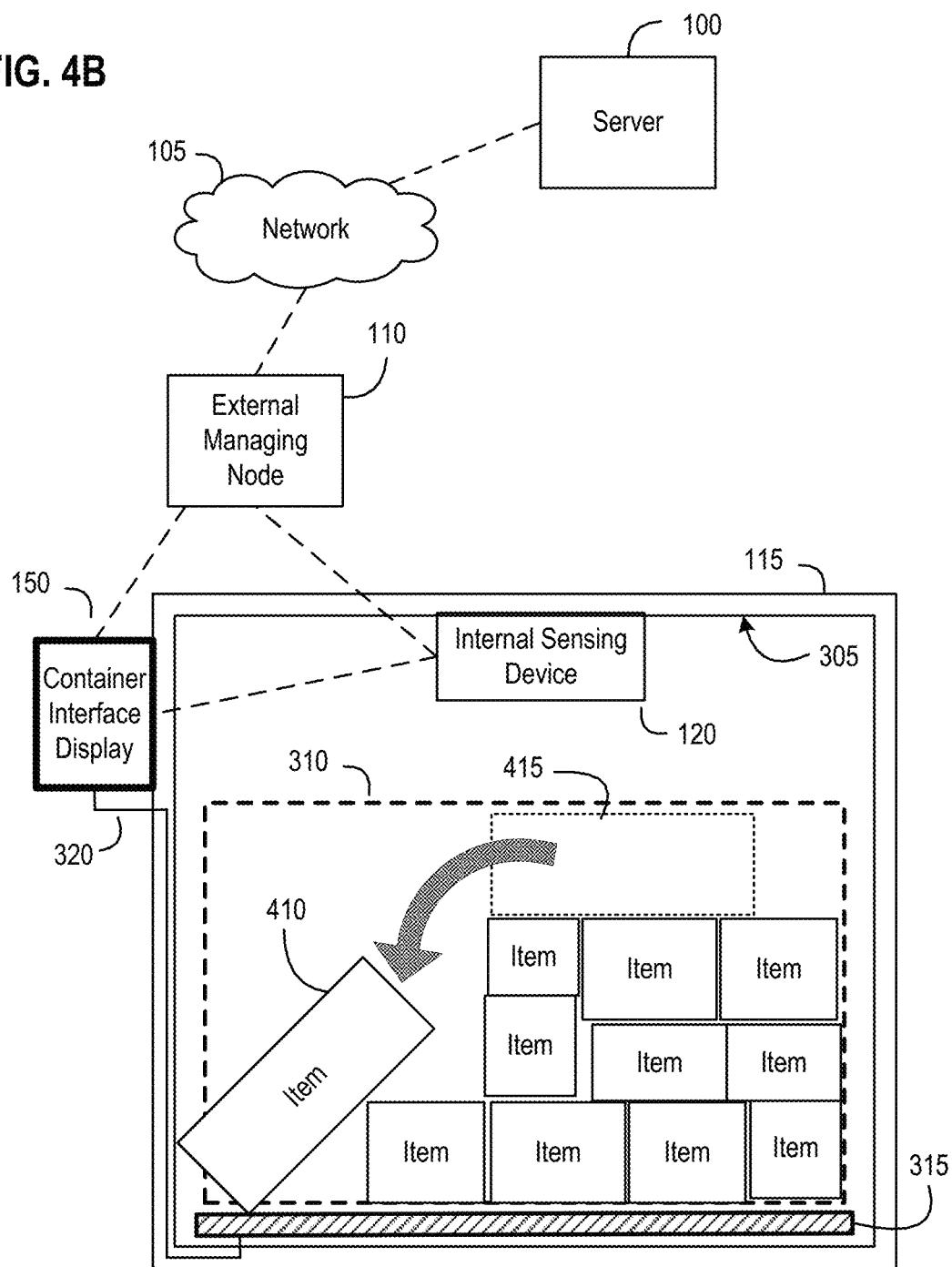

In light of the above description of an exemplary architecture and component parts of exemplary container interface display apparatus 150 (as illustrated in FIG. 2) and other elements of a networked system that may use such exemplary container interface display apparatus 150 (as illustrated in FIG. 1), the FIGS. 3A-3C, 4A, and 4B illustrate particular aspects of one or more exemplary logistics operations that are enhanced and improved through advantageous use of exemplary container interface display apparatus 150. Specifically, FIGS. 3A-3C illustrate an exemplary loading operation involving exemplary container interface display apparatus 150 while FIGS. 4A and 4B illustrate aspects where exemplary container interface display apparatus 150 may be used to detect and electronic relay condition or status information regarding changed conditions to and within the container.

In more detail, FIGS. 3A-3C are a series of diagrams illustrating an exemplary system and various exemplary operations involving an exemplary container interface display apparatus deployed on a container having a scale disposed within it as items are loaded within the container in accordance with one or more embodiments of the invention. Referring now to FIG. 3A, exemplary container 115 is shown having exemplary container interface display apparatus 150 attached to a side or wall of the container 115. Container 115 is shown having a ceiling 305, storage space 310 in which an item 130a may be stored for transport in the container 115, and a scale 315 disposed below the storage space 310 to support and weigh what is placed in storage space 310. In an embodiment, exemplary scale 315 may be formed as part of container 115 with one or more parts of scale 315 incorporated as being not separable from container 115. However, in other embodiments, exemplary scale 315 may be a separate weighing device disposed and attached within the container 115 so as to support and weigh what is placed in storage space 310. Container 115 includes at least one entry (not shown) that may be opened during loading operations and closed when moving or otherwise shipping the container 115 and its contents.

In an embodiment, prior to loading container 115, internal sensing device 120 may be mounted to ceiling 305 or some other part of container 115 above space 310 so as to have a sensory view of space 310. An embodiment of internal sensing device 120 may be mounted in a manner that may be permanent or not intended to be removed from the container 115, or may be mounted as a removable, easily detachable sensing device within container 115. In some applications, logistics personnel may desire to remove the internal sensing device 120 from ceiling 305 of container 115 once the container 115 has been loaded. In other embodiments, may be implemented with one or more sensors internal sensing device 120 integrated as part of container 115.

When mounting or coupling container interface display apparatus 150 to a wall of container 115 so that the display screen 235 is visible outside of container 115, apparatus 150 may be operatively connected to internal sensing device 120 via wired or wireless connections. As shown in at least FIGS. 3A-3C, apparatus 150 wirelessly receives signals from internal sensing device 120 during operation. Similarly, apparatus 150 may be operatively connected to scale 315 within container 115 via wired or wireless connections, though a wired connection 320 is illustrated in at least FIGS. 3A-3C.

Certain of managed logistics information 270 may be entered manually via user input device 230 or touchscreen input on display screen 235, or may be scanned via identification scanner 225, or may be preloaded into container interface display apparatus 150 by, for example, external managing node 110. For example, external managing node 110 may transmit a subset of what is stored in memory 215 as managed logistics information 270 to container interface display apparatus 150 in a preloading message prior to loading of container 115. As such, an embodiment may have container interface display apparatus 150 already aware of, for example, information identifying container 115 that is coupled to apparatus 150 as well as an anticipated inventory of what is to be loaded within container 115 (which may be compared against the inventor of what is currently stored to determine what items are left to be loaded within container 115 during the current logistics cycle for that container.

As mounted on container 115 in a position convenient for logistics personnel to view, container interface display apparatus 150 is operative to facilitate in logistics operations related to the container 115. In general, container interface display apparatus 150 may use identification scanner 225 on apparatus 150 to identify an item (such as item 130a) as the item is brought into and placed within space 310 of container 115 during loading of container 115. In a more detailed embodiment, as item 130a is loaded within space 310, apparatus 150 may identify item 130a, record an association between the container 115 and newly loaded item 130a, increment package count information in memory 215 to reflect the newly loaded item 130a, detect and record the weight of the newly loaded item 130a using scale 315, and may generate information on display screen 235 reflecting at least a portion of managed logistics information 270 related to container 115. The portion of managed logistics information 270 may show what has been loaded, shipping information related to the container, and a status of the container (e.g., loading status, an environmental condition status of the container and its contents, etc.). As such, container interface display apparatus 150 operates help monitor and manage related information associated with logistic operations involving the container 115.

In FIG. 3B, further items are loaded and the container interface display apparatus 150 may update the relevant managed logistics information 270 as loading continues. The updates may be provided to other devices, such as external managing node 110 and shared further with server 100. As described in more detail below, an embodiment may have container interface display apparatus 150 detecting an event related to a detected condition (such as detecting an abnormal temperature, or a detected concussive force) or a delivery related parameter (such as detecting that one or more of the items loaded in container 115 has a prioritized delivery shipment category warranting special processing of the container). The container interface display apparatus 150 may then generate a content related notification and provide information related to such a notification on display screen 235 of container interface display apparatus 150. This may allow for quick and more effective notice to logistics personnel involved in container operations related to container 115.

In FIG. 3C, all items 130a-130n that are to be shipped in container 115 are loaded within storage space 310. The gathered and updated managed logistics information 270 related to the container 115 and items 130a-130n stored within container 115 may be provided by container interface display apparatus 150 to other devices, such as external managing node 110 and shared further with server 100. The portion of managed logistics information 270 shown on display screen 235 may, for example, reflect the loaded status of container 115, what is loaded within container 115, container shipping information related to container 115, and/or one or more scannable objects related to container 115 and/or its contents (e.g., an electronically generated display of a barcode scannable image on display screen 235 that effectively represents one or more parts of managed logistics information 270 that may be dynamically changed by container interface display apparatus 150 without printing new or additional labels to attach and later remove from the exterior of container 115).

In one or more embodiments where exemplary internal sensing device 120 is left mounted within container 115 after the container's entry is closed, exemplary container interface display apparatus 150 may further enhance the technical field of logistics operations (e.g., monitored loading and shipment management) by operating to detect ongoing conditions and events (e.g., movement, shifts in items) within the container. FIGS. 4A and 4B are diagrams illustrating various exemplary configurations of elements where an exemplary container interface display apparatus may be used to detect a type of notification event related to what is stored within a container, and proactively display content related information and/or communicate a notification message to other node devices in accordance with one or more embodiments of the invention.

Referring now to FIG. 4A, container 115 is shown after having been loaded but when internal sensing device 120 connected to container interface display apparatus 150 operates as a depth sensor to map storage space 310 to detect a change in the mapped storage space 31. In more detail, sensor 120 may previously have scanned space 310 and determine that spaces 400 were previously occupied but now are unoccupied. This may, in an embodiment, reflect a changed location for one or more items within space 310, which reflects unintended/undesired change in configuration of what is stored within container 115. Such a change in configuration may reflect potential damage to what is stored within container 115, such as when some items 405 may be crushed and, in some instances, may have spilled contents into the container 115. In another example, as shown in FIG. 4B, an item 410 may have shifted from an initial position 415 as detected by the change in mapped space configuration. With item 410 having shifted during shipment, some items may no longer be supported, some items may be dangerously positions relative to a door to the container's entry, and may pose a safety threat to logistics personnel that have to unload container 115. As such, container interface display apparatus 150 may generate a responsive notification or alert, proactively provide information about the notification or alert on the display screen 235 of apparatus 150, and may transmit information about the notification or alert to a managing node, such as external managing node 110, to report such an operational safety condition. In some embodiments, external managing node 110 may then further report this condition to the back-end server 100 so that server 100 may notify relevant logistics personnel about the particular detected operational safety condition within container 115 and request and/or direct responsive action (e.g., issue a notification to apparatus 150 to display instructions on screen 235 to re-open container 115, provide a warning on screen 235 potential hazardous conditions within container 115 based on what is being shipped within container 115, communicate with external managing node 110 to cause scanning sensor node 120 to monitor environmental conditions within container 115 to detect further changes, such as an increase in temperature, humidity, other changes in unoccupied space, concussive forces detected within or to the container, the existence of smoke particles, the existence of relevant chemicals, and the like.

Managing Logistics Information Related to a Container

In the context of the above description related to an exemplary container interface display apparatus, such as apparatus 150, as deployed and used with a container to enhance and improve logistics operations related to the container, further embodiments are described below in more detail. As generally discussed above, an embodiment of container interface display apparatus, such as apparatus 150, may advantageously gather, manage, and dynamically present relevant electronic logistics information (as part of what is managed logistics information 270 related to a container 115 and its contents) on an electronic display screen device (e.g., screen 235 on apparatus 15). Such relevant electronic logistics information may be selectively shown depending on the type of logistics operation involving the container (such ramp or depot operations that load/unload the container, mid-shipment processing at a shipping facility, etc.) and what particular part of the managed logistics information for the container is desired to be shown on the electronic display screen (such as a scannable barcode image identifying the container and/or its contents, summary information on what is left to be loaded into the container, information on the collective weight of what has already been loaded within the container, notification or alert related information regarding the container or items stored within the container, etc.). Thus, an embodiment of the container interface display apparatus enables an enhanced and improved way to manage and present dynamically relevant logistics information on the container and any of its stored contents to improve logistics operations relative to the container.

Figure 5:
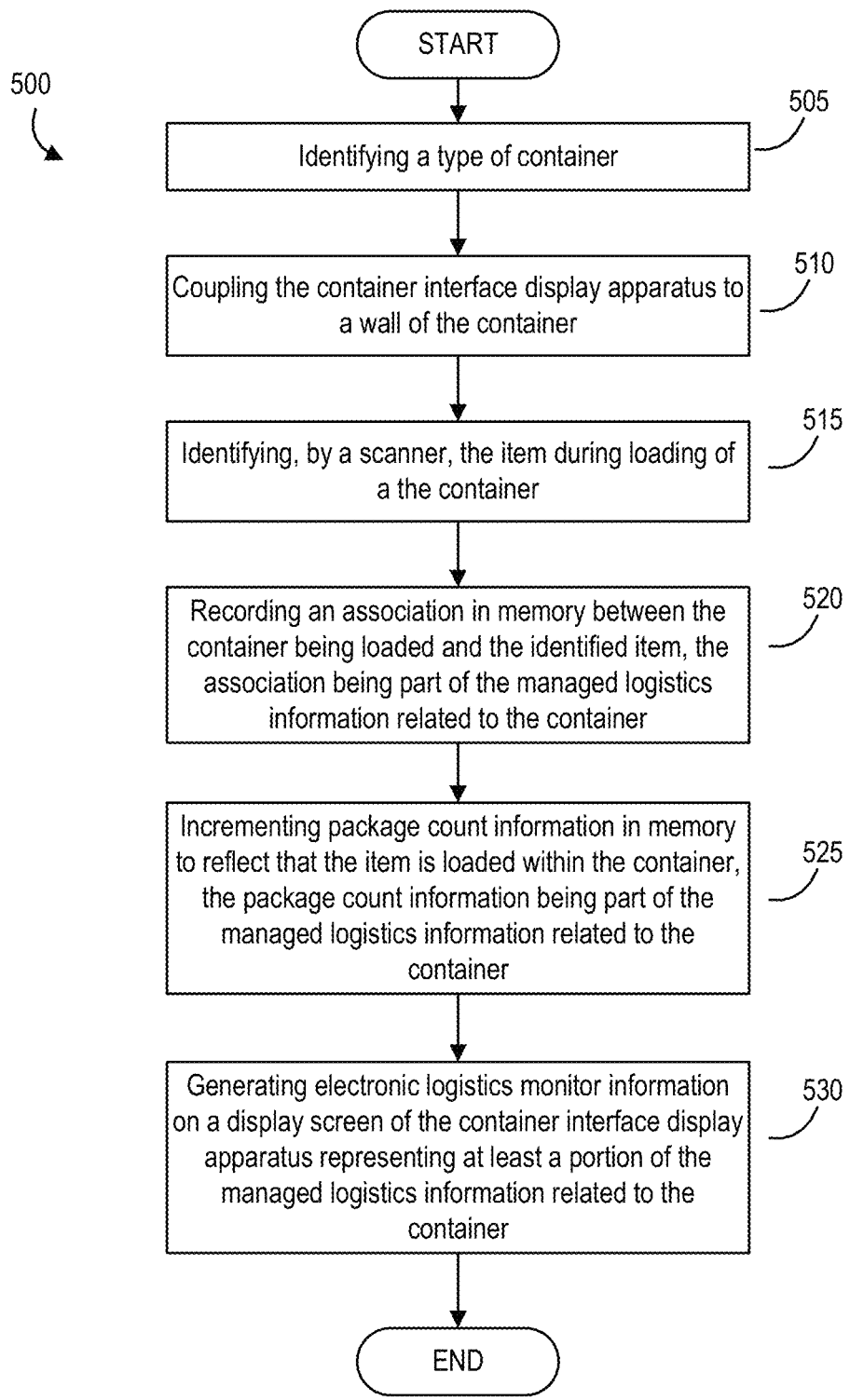
FIG. 5 is a flow diagram illustrating an exemplary method for managing logistics information related to a container using a container interface display apparatus in accordance with an embodiment of the invention.

FIG. 5 is a flow diagram illustrating an exemplary method for managing logistics information related to a container using a container interface display apparatus in accordance with an embodiment of the invention. In this embodiment, the exemplary container interface display apparatus referred to in method 500 comprises at least a mountable housing, a display screen, a memory, a scanner, and a wireless communication interface. In this context and referring now to FIG. 5, method 500 begins at step 505 where an identification sensor on the container interface display apparatus identifies a type of the container, where the type of the container is part of the managed logistics information related to the container. An embodiment of the identification sensor may be implemented as scanner 225 of apparatus 150 where the scanner 220 operates to scan or otherwise receive a signal (such as a reflected barcode scan signal or broadcast identification signal) associated with the container itself. For example, scanner 225 may operate as an identification scanner that detects container type registry information associated with the container and identifies the type of the container based upon the detected container type registry information. Different types of containers may be identified by such particular registry information (e.g., registry information associated with a particular size tractor trailer, a particular configuration of ULD container, or a particular size intermodal shipping container). Such registry information may be represented in a scannable form, such as a barcode image, or in a broadcast electronic form, such as a Bluetooth® low energy signal broadcast from a wireless identification element or node associated with a particular container. Additionally, such registry information may take the form of dimensional information associated with the container (e.g., an exterior size of the container, dimensions of the storage space of the container, etc.).

Alternatively, the step of identifying the container type may be accomplished by having the container interface display apparatus access preloaded parts of the managed logistics information in memory to determine the type of the container. More generally, a further embodiment may have the container interface display apparatus preloading its memory with at least a subset of the managed logistics information before the loading of the container begins (e.g., where the subset includes the container type information or other relevant logistics information that may be provided by another device, such as external managing node 110 or user access device 140c).

When the container interface display apparatus is not integrated as part of the container, method 500 proceeds at step 510 using the mountable housing of the container display apparatus to couple the apparatus to a wall of the container. This is done to place to the container interface display apparatus in an orientation permitting the scanner to identify an item to be shipped within the container as the item is being loaded within the container. For example, the container interface display apparatus may be mounted near an entry to the container and on an exterior wall of the container such that the display screen is visible to personnel involved in loading the container.

While step 510 contemplates the exemplary container interface display apparatus to be separately mountable to the container, and removable from the container as a desired point in time, another embodiment of method 500 may skip step 510 when the container interface display apparatus is integrated as part of the container. For example, a tractor trailer type of container may integrate such an exemplary container interface display apparatus that avoids the need for a separate housing. In more detail, such an integrated container interface display apparatus useful in this alternative embodiment of method 500 may have the display screen of the integrated apparatus disposed on an wall of the container; a memory; a scanner oriented to permit identifying an item to be shipped within the container as the item is loaded within the container, and a wireless communication interface operative to communicate with a node device (such as an external managing node 110).

Proceeding from step 510 to step 515, method 500 has the scanner of the container interface display apparatus identifying the item during loading of the container. For example, scanner 225 as described relative to FIG. 2 may be implemented as a scanner conducts a scan by sending out an interrogating signal or beam and listens for a response, or simply listens for a broadcast signal to receive information related to the item being shipped as a way of identifying the item. As such, embodiments of container interface display apparatus may, for example, rely on a barcode scanner, a radio frequency identification (RFID) reader, a near field communications (NFC) interface, a Bluetooth® radio, Ant+ interface radio, or other wireless network data communications device, and the like to operate as the scanner to identify the item during loading of the container.

At step 520, method 500 proceeds with the container interface display apparatus recording an association in memory, where the association is a tracked and managed relationship between the container being loaded and the identified item and where the association is part of the managed logistics information related to the container. For example, in the embodiment illustrated in FIG. 2 and FIG. 3A, exemplary container interface display apparatus 150 may record association information as part of an update of contents data 280 to reflect the established association relationship between container 115 and item 130a as item 130a is loaded into container 115 and identified by apparatus 150.

At step 525, method 500 proceeds with the container interface display apparatus incrementing package count information (a type of managed logistics information related to the container) in the memory of the container interface display apparatus to reflect that the item to be shipped within the container is loaded within the container. As shown in FIG. 3A, the package count information stored in memory 215 as part of container data 275 may be incremented to reflect that item 130a is loaded within space 310 of container 115.

At step 530, method 500 continues by generating electronic logistics monitor information on the display screen of the container interface display apparatus. The electronic logistics monitor information, which appears on display screen of the apparatus, comprises at least a portion of the managed logistics information related to the container. For example, an embodiment may generate updates to package count information or a summary of what items are associated with the container as the electronic logistics monitor information. In a further embodiment, the electronic logistics monitor information generated on the display screen of the container interface display apparatus in step 530 may include one or more scannable objects (such as one or more graphic electronic scannable barcode images capable of being optically scanned) representing one or more parts of the managed logistics information related to the container. In still another embodiment, method 500 may generate the electronic logistics monitor information on the display screen of the container interface display apparatus by selecting the portion of the managed logistics information to display based upon input from logistics personnel involved in loading the container (e.g., based upon input received via user input device 230 and/or touchscreen input received via display screen 235), and generating the selected portion of the managed logistics information to the logistics personnel on the display screen. For example, based on user input, the container interface display apparatus may selectively display particular scannable objects representing relevant parts of the managed logistics information (e.g., an identification of the container, an inventory of the container, a weight of what is stored in the container, a current package count of what is stored within the container).

In further embodiments of method 500, the managed logistics information may include information regarding previously loaded items. In more detail, the managed logistics information in memory of the container interface display apparatus may include a second association between the container being loaded and a previously identified second item. Further, the updated package count information may also comprise information that reflects what has previously been loaded within the container. Thus, the managed logistics information may be a dynamic set of information related to the container where some or all of the information may be used when presenting electronic logistics monitor information on the display screen relevant to particular logistics operations involving the container.

Additionally, an embodiment may have the managed logistics information further comprises identification information for the particular container. Similar to that described above relative to identifying a type of the container, the container interface display apparatus may receive such identification information or detect such identification information that specifies the particular container (as opposed to merely the container type or its related storage space dimensions).

Still another embodiment may have the managed logistics information including container shipping information, such as an inventory of what is intended to be loaded into the container and/or location specific information of where the items in the inventory are or should be loaded within the container. Such container shipping information may enhance loading/unloading operations when the some or all of the container shipping is presented as part of the electronic logistics monitor information on the display screen for use by loading/unloading logistics personnel (such as ramp personnel, delivery courier personnel, warehouse personnel, and the like).

Those skilled in the art will appreciate that method 500 as disclosed and explained above in various embodiments may be implemented with an apparatus, such as exemplary container interface display apparatus 150, running an embodiment of logistics information management program code 260. Such code may be stored on a non-transitory computer-readable medium such as memory storage 215 on container interface display apparatus 150. Thus, when executing code 260, the processing unit 210 of container interface display apparatus 150 may be operative to perform operations or steps from the exemplary methods disclosed above, including method 500 and variations of that method.

In more detail, such an exemplary container interface display apparatus for managing logistics information related to a container may include a processing, a memory, a scanner, a wireless communication interface, and a display screen. The memory, scanner, wireless communication interface, and display screen are each operatively coupled to the processing unit. The memory maintains at least a logistics information management program code section (such as code 260) for execution by the processing unit as well as package count information and association information related to what is stored within the container. The scanner functions to scan and identify an item to be shipped with the container as the item is being loaded within the container. The wireless communication interface provides for access to a wireless communication path for communication with a node device (such as user access device 140c or external managing node 110). The display screen is disposed substantially on or near an exterior wall of the container for interaction with logistics personnel loading the container.

The apparatus' processing unit, when executing the logistics information management program code section, specially adapts the container interface display apparatus beyond that of a general computer given structure recited above and the unconventional nature of the collective functionality as described herein. As such, the processing unit in this embodiment is operative to at least identify the item during loading of the container based upon a scanning result signal sent by the scanner to the processing unit; update the association information maintained in the memory, where the updated association information reflects at least an association between the container being loaded and the identified item and where the association information is part of the managed logistics information related to the container; increment the package count information maintained in the memory, where the incremented package count information at least reflects that the item to be shipped within the container is loaded within the container and is part of the managed logistics information related to the container; and cause the display screen to provide electronic logistics monitor information on the display screen, where the electronic logistics monitor information comprises at least a portion of the managed logistics information related to the container. Such electronic logistics monitor information provided on the display screen may, for example, include one or more scannable objects representing one or more parts of the managed logistics information related to the container (such as scannable barcode images representing an identification of the container, association information on what shippable items are currently associated with the container in a tracked relationship, and a package count of what is stored in the container).

In a further embodiment, the content interface display apparatus may include a detachable coupling that allows the apparatus to be removably attached to the exterior wall of the container via, for example, a magnetic part that connects the apparatus to the exterior wall or other quick connect/disconnect type of mechanism as described herein. In an alternative embodiment, the apparatus may be disposed relative to the external wall by a fixed coupling that allows the apparatus to be secured to the exterior wall of the container. In still another embodiment, the elements of the apparatus may be collectively part of the container, such as being integrated into a portion of the exterior wall of the container so that logistics personnel may view the display screen while loading/unloading the container.

In another embodiment of the content interface display apparatus, the managed logistics information may include identification information for the container, container shipping information (such as an inventory of what is intended to be loaded into the container and/or location specific information of where an item should be loaded within the container).

In still another embodiment, the content interface display apparatus may include an identification sensor operatively coupled to the processing unit. The identification sensor may be configured to identify a type of the container, which is part of the managed logistics information related to the container. In more detail, the identification sensor may operate to detect container type registry information associated with the container (such as barcode information associated with the container and/or dimensional information associated with the container) and provide a container type signal to the processing unit, which then identifies the type of the container based upon the container type signal provided by the identification sensor.

In some embodiments, the identification sensor may be implemented as the same scanner noted above. For example, if the container may provide a signal having information identifying the type of the container that is the same type of formatted signal broadcast from an item being loaded (e.g., both being Bluetooth® signals), the same type of sensing/scanning device may be used. However, in other embodiments, the sensor that identifies the type of container may be distinct from the scanner that identifies items as they are loaded within the container. For example, the type of container may be indicated by barcode information, but the identity of an item being loaded may be detected by an RFID tag signature.

In still further embodiments, the display screen of the container interface display apparatus may be operative to display interactive content as the electronic logistics monitor information. In more detail, the display screen may be implemented with a ruggedized touchscreen, such as an ingress protection rated display interface capable of receiving touch gestures as input while being precipitation resistant.

Additionally, the container interface display apparatus may include other user input device(s) coupled to the processing unit where the devices, such as user input device 230 as explained in FIG. 2, allow interaction with the apparatus to modify the managed logistics information itself, and/or to receive input from a user as part of selecting the portion of the managed logistics information to show on the display screen.

In summary, various embodiments of exemplary methods and apparatus systems are described above that leverage use of an exemplary container interface display apparatus to help improve and enhance how to manage logistics information related to a container.

Managing Logistics Information & a Container Scale

Figure 6A:
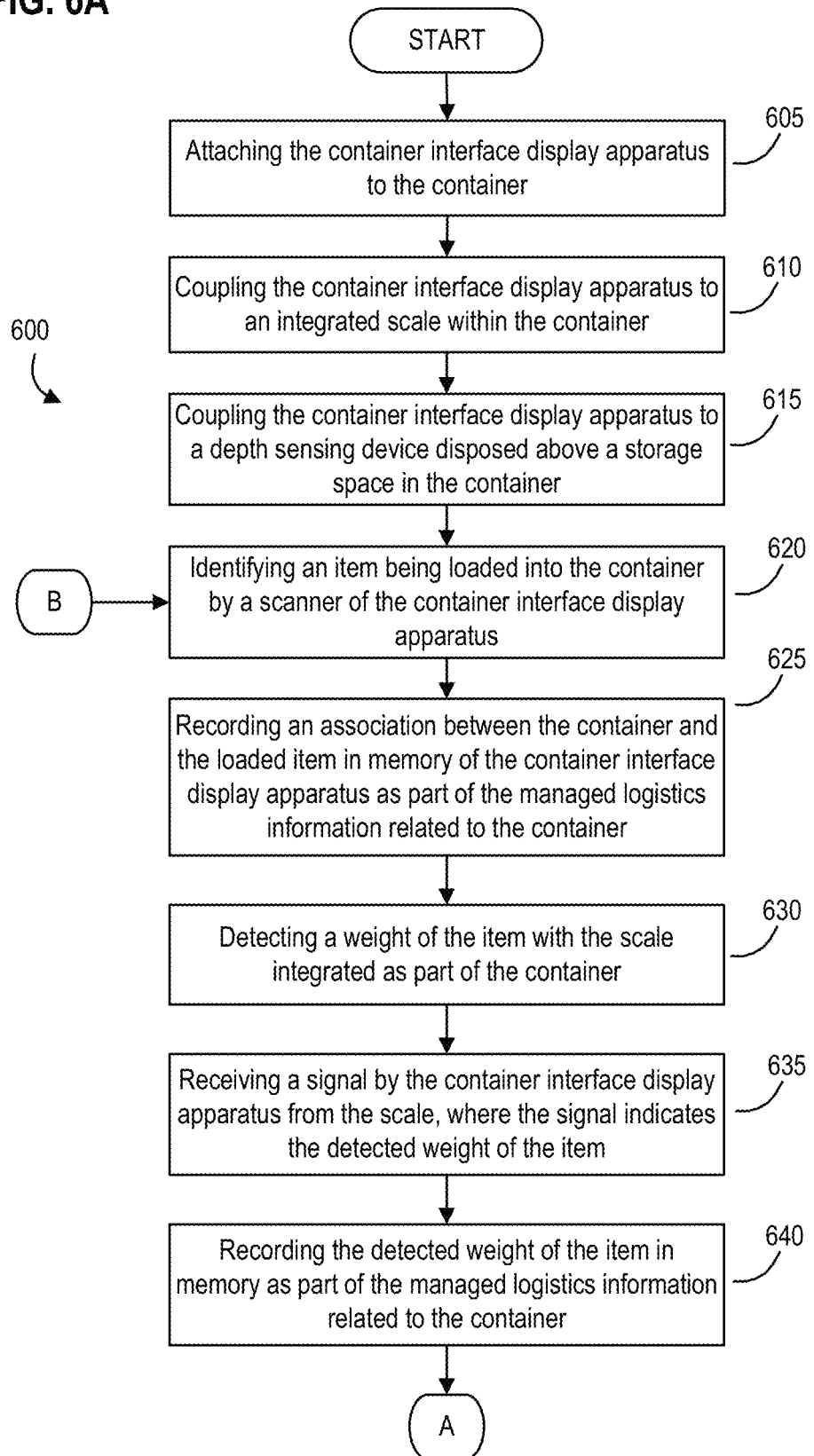

As explained above in general and with more detail relative to FIGS. 3A-3C, an exemplary container interface display apparatus may be deployed in further embodiments that may involve a scale that is at least disposed within a container. Such a scale may be a separate device or may be integrated as part of the container itself. And with a scale disposed within the container, an embodiment of the container interface display apparatus may further enhance and improve logistics operations related to the container, as will exemplary systems that may deploy such an exemplary container interface display apparatus and scale-enabled container. FIGS. 6A and 6B are, collectively, a flow diagram illustrating an exemplary method for managing logistics information related to a container using a container interface display apparatus when the container has a scale at least disposed within the container and coupled to the container interface display apparatus in accordance with an embodiment of the invention.

Referring now to FIG. 6A, method 600 may begin at step 605 where the container interface display apparatus is attached to a part of the container. For example, the container interface display apparatus may be attached an exterior wall of the container, an interior wall of the container, a structural support member (e.g., a beam, a column) within the container, or a door associated with an access entry to the container. In such an attached configuration, the container interface display apparatus may be placed in an orientation permitting the scanner to identify the item to be shipped within the container as the item is being loaded within the container. The exemplary container may have one or more entry points or openings, and may one of a variety of types of containers, such as a unit load container (ULD) for transport on an aircraft, a storage container area integrated as part of a vehicle (e.g., a package storage compartment or dedicated area disposed within or on a delivery van or other vehicle), a tractor trailer pulled by a semi-truck, or an intermodal container for intermodal shipment.

At step 610, method 600 may proceed by coupling the container interface display apparatus to the scale within the container. In an embodiment, coupling the container interface display apparatus to the scale may involve establishing a wired or wireless connection between the container interface apparatus and the scale disposed within the container. For example, in the embodiment illustrated in FIG. 3A, container interface display apparatus 150 may be coupled to scale 315 disposed within container 115 by means of a wired connection 320 that couples to interface circuitry 220 on container interface display apparatus 150. However, an alternative embodiment may have container 115 having an integrated scale that may be in communication with container interface display apparatus 150 via a wireless connection. For example, another embodiment of container 115 may be a node-enabled type of container where the node (not shown) that is part of container 115 is a transceiver-based processing device with a similar architecture as apparatus 150, but at least having a wireless interface, and circuitry coupled to scale 315 within container 115 such that the node device gathers weight measurements using scale 315 and wirelessly transmits such measurements back to other nodes, such as the container interface display apparatus 150.

At step 615, method 600 may involve operatively coupling the container interface display apparatus to a depth sensing device disposed above a storage space within the container. For example, the container interface display apparatus may establish a wired or wireless connection to a depth sensing device, such as internal sensing device 120, disposed within container 115 as shown in FIG. 3A. The depth sensing device may, in an embodiment, be one or more depth sensing elements, sensors, cameras that scan or map the space exposed to those elements, sensors, or cameras and provide dimensional information relative to a configuration of what occupies the storage space within the container.

At step 620, method 600 proceeds with a scanner of the container interface display apparatus identifying the item during loading of the container. For example, as item 130a is loaded as shown in FIG. 3A, scanner 225 on apparatus 150 may detect a signal that identifies item 130a, such as a Bluetooth® signal broadcast from a low energy Bluetooth® radio in a wireless identification element/node associated with item 130a or a reflected barcode scan signal back from barcode information on item 130a.

At step 625, method 600 continues with the container interface display apparatus recording an association in memory between the container being loaded and the identified item. The recorded the association being part of managed logistics information related to the container. In more detail, the recorded association may be stored as part of contents data 280 in managed logistics information 270, where the data corresponding to the recorded association reflects a tracked and managed association relationship actively established between the container and, for example, item 130a loaded within the container as shown in FIG. 3A.

At step 630, method 600 proceeds with the scale in the container detecting a weight of the item loaded within the container and, at step 635, having the container interface display apparatus receive a signal from the scale indicating the detected weight of the item. And at step 640, method 600 proceeds with the container interface display apparatus recording in its memory the detected weight of the identified item, which is part of the managed logistics information related to the container.

After step 640, method 600 proceeds through Transition Point A as shown in FIG. 6A to Transition Point A as shown in FIG. 6B. Referring now to FIG. 6B, method 600 may continue at step 645 where the depth sensing device coupled to the container interface display apparatus may map the storage space within the container to generate dimensional data reflecting an occupied configuration of the storage space. For example, once item 130*a* (as shown in FIG. 3A) is loaded within storage space 310 of container 115, a depth sensor (which may be implemented with internal sensing device 120) may conduct a mapping scan of storage space 310 to generate dimensional data reflecting the current occupied configuration of the storage space 315 including item 130*a* as placed within the space 310.

At step 650, method 600 proceeds with the depth sensing device transmitting a message to the container interface display apparatus where the message reflects the occupied configuration of the storage space. In one embodiment, this may be accomplished by simply providing the dimensional data generated as the message to the container interface display apparatus. In other embodiments, a separate message may be prepared by the depth sensing device that includes information about the occupied configuration. Those skilled in the art will appreciate that this will depend upon the complexity of how the depth sensing device may be implemented and how it may operate to perform and report about its mapping activity regarding the storage space configuration.

At step 655, method 600 proceeds with the container interface display apparatus recording the occupied configuration of the storage space in memory as part of the managed logistics information related to the container. As will be explained in more detail below, further embodiments may periodically monitor the occupied configuration in this manner to detect an event indicative of a shift in one or more items stored within space 310, and allowing for proactive and corrective notifications to be generated that improve the logistics operations related to the container and its contents.

At step 660, method 600 proceeds to generate electronic logistics monitor information on the display screen of the container interface display apparatus. The information shown on the display screen (generally referred to as the electronic logistics monitor information) is at least a portion of the managed logistics information as explained above. In a further embodiment, generating this type of information on the display screen in step 660 may involve selecting the portion of the managed logistics information to display based upon input from logistics personnel involved in loading the container, and generating the selected portion of the managed logistics information to the logistics personnel on the display screen as a logistics status of the container during loading, such as information that includes item-level information on the contents presently loaded within the container and/or container-level information on the contents presently loaded within the container. In more detail, an embodiment may have such container-level information at least including a current weight of the contents presently loaded within the container; container shipping information (such as an inventory of what is intended to be loaded into the container, location specific information of where one or more items intended to be loaded should be placed within the container due to, for example, a weight of the item or packaging of the item). A further embodiment may have such container-level information including other status information regarding to what is presently loaded within the container. For example, the container-level information may include volume information on what is loaded within the container (e.g., a number of items loaded within the container, a volumetric reading of remaining storage capacity of the container or occupied status of the storage area of the container). Such volume information may come from, for example, sensors (e.g., depth sensors) deployed as part of internal sensing device 120.

In one or more embodiments, the portion of the managed logistics information shown the display screen may be represented by one or more scannable objects related to container 115 and/or its contents (e.g., an electronically generated display of a barcode scannable image on display screen 235 that effectively represents one or more parts of managed logistics information 270 that may be dynamically be changed by container interface display apparatus 150 without printing new or additional labels to attach and later remove from the exterior of container 115). The portion of the managed logistics information shown on the display screen may include textual, graphic, numerical, and/or other symbolic images and information that correspond to and/or summarize the desired portion of the managed logistics information to be shown on the display screen. Such displayed information as gathered and managed by the container interface display apparatus may help notify logistics personnel as part of a logistics operation related to the container, or provide information to other logistics devices (such as barcode scanners, machine vision systems, and the like) that may process the container during a logistics operation.

At step 665, method 600 proceeds back to step 620 if additional items are yet to be loaded into the container. Thus, in an embodiment where additional items are still to be loaded, method 600 may involve using the scanner on the container interface display apparatus to incrementally identify each of the additional items as the additional items are loaded within the container (similar to that described in step 620); incrementally recording additional associations in the memory, wherein each of the additional associations respectively represent a relationship between the container and each of the additional items loaded within the container and the additional associations are part of the managed logistics information related to the container (similar to that described in step 625); incrementally detecting respective weights for each of the additional items loaded within the container, wherein the respective weights, volume, and/or load density for each of the additional items are part of the managed logistics information related to the container (similar to that described in steps 630-640); and periodically generating an update of the electronic logistics electronic information on the display screen related to the managed logistics information, where the update reflects a current logistics status of the container during the loading operation for the container. However, if there are no additional items to load, method 600 concludes after step 665.

Those skilled in the art will appreciate that certain steps of method 600 as disclosed and explained above in various embodiments may be implemented with an apparatus, such as exemplary container interface display apparatus 150, running an embodiment of logistics information management program code 260 as part of a system that improves managing logistics information related to a loading operation of a container. Such code may be stored on a non-transitory computer-readable medium such as memory storage 215 on container interface display apparatus 150. Thus, when executing code 260, the processing unit 210 of container interface display apparatus 150 may be operative to perform certain operations or steps from the exemplary methods disclosed above, including method 600 and variations of that method.

Such an exemplary improved system for managing logistics information related to a loading operation for a shippable item may include a scale-enabled container and a container interface display apparatus disposed on a wall of the container. In more detail, the container interface display apparatus may be removably attached to the wall of the container in an orientation permitting the scanner to identify the shippable item during a loading operation of the container. For example, the container interface display apparatus may be temporary secured to a wall, such as an exterior wall, of the container.

The container is used for transporting the shippable item (e.g., container 115) and comprises at least a storage space, at least one entry, and a scale. The storage space is within the container for maintaining the shippable item once loaded within the container. The one or more entries provide access through which to enter and exit the storage space as part of loading the container. The scale is at least disposed within the storage space of the container to support the shippable item once loaded within the container. In some embodiments, the scale may be fixed to the container and, in more detail, may be an integrated part of the container. The scale may have a base that supports items placed within the storage space yet still allow for restrained movement of those items (e.g., providing tie down or fixing structure relative to capture and hold items in a desired configuration within the storage space). The container used for transporting the shippable item in the exemplary system may, for example, be implemented by a unit load container (ULD) for transport on an aircraft, a storage container area integrated as part of a vehicle, a tractor trailer, or an intermodal container for intermodal shipment.

The container interface display apparatus in the exemplary system may further include at least a processing unit, a scanner, a scale interface circuit, a memory, and a display screen. The scanner, scale interface circuit, memory, and display screen are each operatively coupled to the processing unit. The scanner operates in this system to receive an identification signal (such as a reflected barcode scanning signal or a broadcast Bluetooth® signal) identifying the shippable item during loading of the container. The scale interface circuit operates in this system to receive a signal from the scale, where the signal indicates a detected weight of the shippable item once loaded within the container. The memory maintains at least a logistics information management program code section (such as code 260) for execution by the processing unit, as well as the managed logistics information related to the loading operation comprising. Such managed logistics information includes at least an association between the container and the shippable item and the detected weight of the shippable item. The display screen is oriented, relative to the wall of the container, for interaction with logistics personnel loading the container (e.g., facing outward from the wall and exposed so that logistics personnel may provide touchscreen input to the display screen).

As part of the system, the processing unit of the container interface display apparatus, when executing the logistics information management program code section, is operative to specially adapt the container interface display apparatus as it functions as part of the system. More specifically, the processing unit of the container interface display apparatus, when executing the logistics information management program code section, is operative to at least identify the shippable item based upon the identification signal received by the scanner; record the association in the memory as part of the managed logistics information after identifying the shippable item; record the detected weight in memory as part of the managed logistics information based upon the signal received from the scale; and cause the display screen to provide electronic logistics monitor information on the display screen, wherein the electronic logistics monitor information comprises at least a portion of the managed logistics information maintained in the memory.

In a further embodiment of the system, the portion of the managed logistics information provided on the display screen may indicate item-level information on the contents presently loaded within the container and/or container-level information on the contents presently loaded within the container. Such container-level information may comprise at least a current weight of the contents presently loaded within the container, volumetric information on the contents presently loaded within the container, and/or relative occupancy of the contents relative to the storage capacity of the container. Additionally, the managed logistics information may container shipping information, which may identify an inventory of what is intended to be loaded into the container or, in some embodiments, location specific information of where one or more item should be loaded within the container (such as particular locations that may better support heavy items or locations that may help increase or maximize the number of items that can be placed within the container).

In another embodiment, the system may further include a depth sensing device disposed above the storage space and operative to communicate with the container interface display apparatus and facilitate mapping the storage space of the container. In particular, the depth sensing device, when used as an element of the system, may operate to map the storage space once the item is loaded within the container to generate dimensional data reflecting an occupied status of the storage space and then transmit a message to the container interface display apparatus, where the message reflects the occupied status of the storage space. Thereafter, the processing unit of the container interface display apparatus may receive the message from the depth sensing device, determine the occupied status of the storage space based upon the message, and record the occupied status of the storage space as part of the managed logistics information related to the container.

In still another embodiment, the system may further include at least one user input device coupled to the processing unit of the container interface display apparatus. The user input device (such as touchscreen elements that may be integrated with the display screen, separate buttons, or soft keys on a bezel of the display screen) allows interaction with the container interface display apparatus to selectively alter which of the managed logistics information is shown on the display screen as the portion of the managed logistics information.

A further embodiment of an improved system for managing logistics information related to a loading operation for a shippable item may involve a container, a container interface display apparatus, and a managing node device. In this embodiment, the container is one used for transporting the shippable item. The container has a storage space within the container and an integrated scale disposed within the storage space as part of the container to support the shippable item once loaded within the container. When operating, the integrated scale generates a signal reflecting a weight of what is supported on the scale within the storage space. The container used for transporting the shippable item may, for example, be a unit load container (ULD) for transport on an aircraft, a storage container area integrated as part of a vehicle, a tractor trailer having one or more entry points, or an intermodal container for intermodal shipment.

In this system embodiment, the container is connected to the container interface display apparatus. More specifically, the container interface display apparatus is removably disposed on an exterior wall of the container. The container interface display apparatus comprises a housing, a processing unit, a scanner, interface circuitry, memory, a display screen, and a communication interface.

The housing is a part of the container interface display apparatus that is removably attached to the exterior wall of the container, and may include detaching or other coupling structure (e.g., magnets, clips, etc.) that allow for temporarily attaching the housing to the wall of the container. The processing unit, scanner, interface circuitry, memory, display screen, and communication interface are, respectively, disposed at least partially within the housing. For example, the scanner may have a part or element that is exposed beyond the housing as may the communication interface (e.g., an antenna for the communication interface may be exposed outside the housing itself).

The scanner operates in the system to receive an identification signal identifying the shippable item during loading of the container. As described above, such an identification signal may be a signal received by the scanner, such as a reflected barcode scan signal or a detected Bluetooth® signal from an identification element associated with the shippable item. More specifically, the scanner may be operative to capture a reflected barcode scan signal or an emitted identification device signal as the identification signal identifying the shippable item.

The interface circuitry may provide a connection, such as a plug connector of a mated plug connection, accessible through the housing to allow for a connection of the interface circuitry to the integrated scale of the container. As such, the interface circuitry may receive the generated signal from the integrated scale indicating a detected weight of the shippable item once loaded onto the integrated scale.

The memory in the container interface display apparatus maintains operational code and data (similar to that shown in memory 215 of FIG. 2). In particular, the memory in this system embodiment maintains at least a logistics information management program code section for execution by the processing unit, as well as data reflecting an association between the container and the shippable item and data reflecting the weight of the shippable item as detected by the integrated scale.

The display screen of the apparatus is disposed on the housing in a configuration oriented away from the exterior wall of the container for interaction with logistics personnel loading the container. In more detail, the display screen may be disposed within an opening on the housing but remain configured with the housing in a ruggedized, ingress protected condition so that the container interface display apparatus is at least resistant to dust, moisture, and other precipitants.

The managing node device (such as external managing node 110) includes a logistics data store device (such as a local database or memory storage) for maintaining information related to the loading operation. The managing node device is operative to communicate and interact with the wireless communication interface of the container interface display apparatus over a wireless communication path as a way of receiving information and messages from the container interface display apparatus and providing information, messages, and/or new programming to the container interface display apparatus.

In this system embodiment, the processing unit of the container interface display apparatus, when executing the logistics information management program code section, is operative to identify the shippable item based upon the identification signal received by the scanner; record the association in memory as part of the managed logistics information after identifying the shippable item; record the detected weight in memory as part of the managed logistics information based upon the signal received from the integrated scale; cause the display screen to provide electronic logistics monitor information on the display screen, where the electronic logistics monitor information comprises at least a portion of the managed logistics information maintained in the memory; and cause the wireless communication interface to transmit a message to the managing node device, where the message relates to the managed logistics information related to the container.

In response, the managing node device in this system embodiment is operative to receive the message from the container interface display apparatus, and update the logistics data store device with the managed logistics information as communicated in the message.

In a more detailed embodiment of this system, the portion of the managed logistics information provided on the display screen of the container interface display apparatus may indicate item-level information on the contents presently loaded within the container and/or container-level information on what is loaded within the storage space. Such container-level information may include at least a current weight of what is loaded within the storage space.

Likewise, the managed logistics information may container shipping information, such as an inventory of what is intended to be loaded into the container and/or location specific information of where one or more of the items should be loaded within the container (e.g., such location information being related to a weight of the item).

In a further embodiment, system may further include a depth sensing device disposed above the storage space and operative to communicate with the container interface display apparatus through the interface circuitry. As such, the depth sensing device may be operative to map the storage space once the shippable item is loaded within the storage space to generate dimensional data reflecting an occupied status of the storage space, and notify the container interface display apparatus of the occupied status of the storage space based upon the generated dimensional data. Additionally, in this further embodiment, the interface circuitry may receive the notification from the depth sensing device and communicate the notification to the processing unit. The processing unit may then receive the communication from the interface circuitry regarding the notification; determine the occupied status of the storage space based upon the communication; record the occupied status of the storage space in the memory as part of an update to the managed logistics information related to the container; and cause the wireless communication interface to transmit an occupied status message to the managing node device, where the occupied status message relates to or reflects the update to the managed logistics information related to the container. In this manner, occupied status information may be managed as part of the logistics information related to the container, and such information may be quickly and efficiently disseminated to other devices (such as the managing node device) involved in the loading operation.

In yet a further embodiment, the system may also include at least one user input device coupled to the processing unit of the container interface display apparatus. The user input device facilitates receiving selective input to alter which of the managed logistics information is shown on the display screen as the portion of the managed logistics information.

Updated Logistics Info and Content Related Notifications

As explained above in general, and with more detail relative to FIGS. 4A and 4B, an exemplary container interface display apparatus may be deployed in further embodiments that may generate a content related notification when logistics information related to a container and managed by the container interface display apparatus changes. When the container interface display apparatus is deployed in an embodiment, the apparatus may operate to stay aware of the loading or unloading operation and gather further relevant container information, such as additional information received or detected related to the container, or more specifically, related to what is stored within the container. Based upon this relevant container information, the container interface display apparatus updates part of all of the managed logistics information the apparatus maintains in its memory and can alert and notify logistics personnel via its display screen about important notification events reflected in the updated managed logistics information as well as notifying other nodes (e.g., an external managing node, a user access device, and a back-end server) via time effective alert or notification messages to such nodes.

In general, a notification event may be detected based upon a piece of the managed logistics information that has been preloaded, sensed, or otherwise obtained by the container interface display apparatus. The notification event may be related to the status of the container or item(s) stored within the container. As will be explained in more detail below, a notification event related to status information associated with the container may, for example, take the form of one or more detected conditions relative to the storage space within the container or an unanticipated change in configuration in what has been placed within the container. Additionally, a notification event related to a particular item or group of items stored within the container may be a delivery related parameter worthy of particular attention to those involved in loading or unloading the container, as well as worthy of proactively notifying others. The particular embodiments described below focus on a method for generating a content related notification using an exemplary content interface display apparatus, an embodiment of the apparatus, and an embodiment of a system that leverages such an apparatus as other devices in the system are proactively notified and further logistics messaging may be set in motion to enhance and improve logistics operations related to the container.

Figure 7:
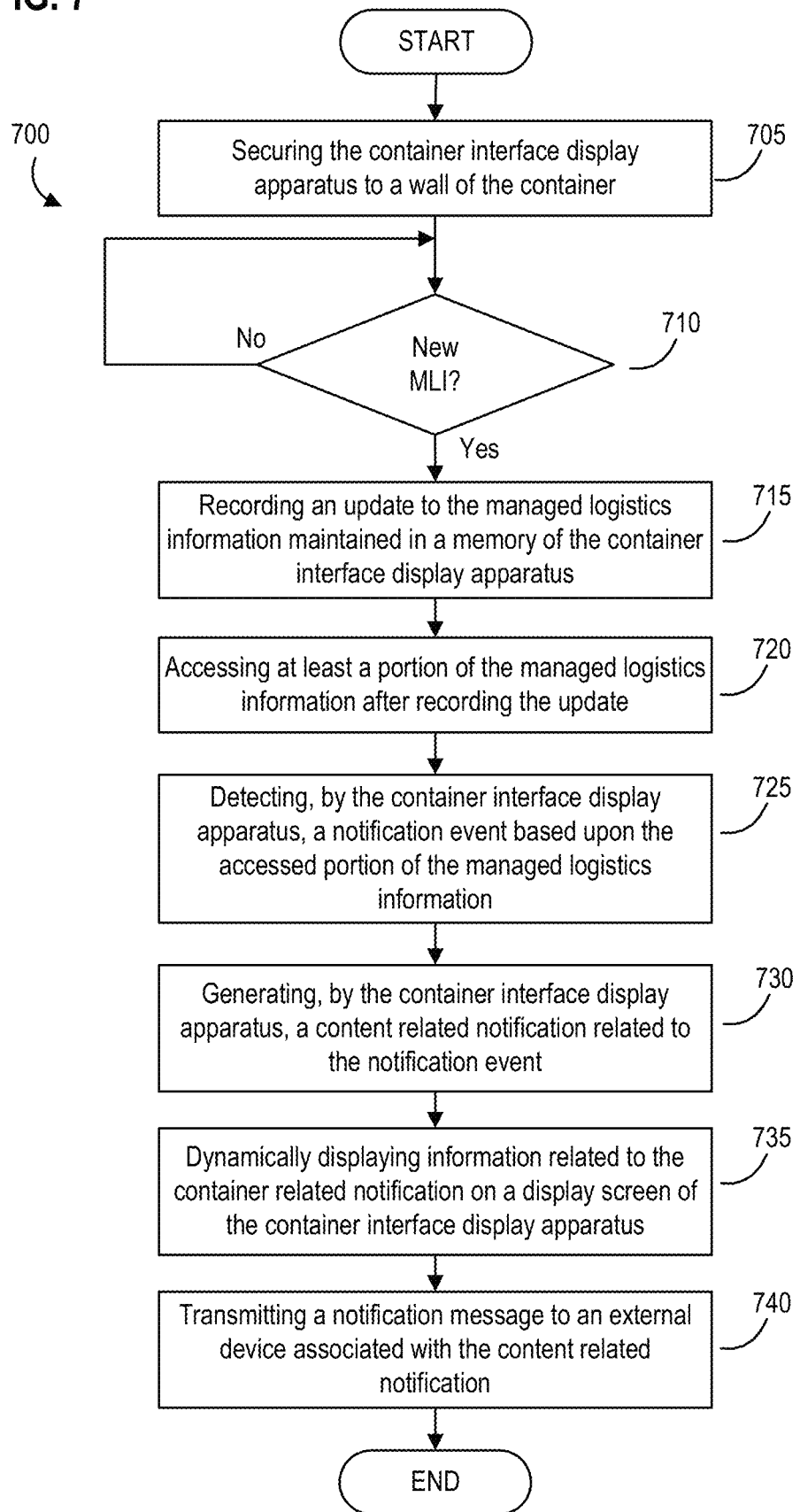
FIG. 7 is a flow diagram illustrating an exemplary method for generating a content related notification based upon managed logistics information related to a container using a container interface display apparatus in accordance with an embodiment of the invention.

FIG. 7 is a flow diagram illustrating an exemplary method for generating a content related notification based upon managed logistics information related to a container using a container interface display apparatus in accordance with an embodiment of the invention. Referring now to FIG. 7, method 700 may begin at step 705 where the container interface display apparatus may be secured to the container (e.g., to an exterior wall of the container) in an orientation exposing a display screen of the container interface display apparatus outwardly from the container. This orientation, for example, allows for ramp logistics personnel loading or unloading the container to easily view and see any notification or alert messaging shown on the display screen during operations. As mentioned above, an exemplary container may be implemented as a unit load container (ULD) for transport on an aircraft, a storage container area integrated as part of a vehicle; a tractor trailer to be pulled with a truck; or an intermodal container for intermodal shipment.

At step 710, if new or updated managed logistics information has been received or detected by the container interface display apparatus, step 710 proceeds to step 715. In more detail, the container interface display apparatus as secured on the container and activated so as to be operational, stands ready to gather further relevant container information in step 710. Such further relevant container information may include received information from other devices (such as external managing node 110) or detected information obtained by the container display apparatus using scanners/sensors (such as detected additional information related to the container, detected conditions of the container and its storage area, and/or detected information related to particular items stored within the container). When the container interface display apparatus gathers such relevant container information (a type of managed logistics information), method 700 proceeds to step 715. Otherwise, method 700 may remain in step 710 waiting for new managed logistics information as additionally relevant container information.

At step 715, method 700 has the container interface display apparatus recording an update to the managed logistics information maintained in a memory of the container interface display apparatus. In more detail, the update to the managed logistics information maintained in the memory is associated with the newly gathered relevant container information (such as a detected temperature within the container or a detected change in the configuration of what is stored within the container or a detected delivery related parameter worthy of further action by the container interface display apparatus).

At step 720, method 700 has the container interface display apparatus accessing at least a portion of the managed logistics information maintained in the memory after recording the update. In other words, the container interface display apparatus is triggered to review at least some of the managed logistics information at certain points, such as when the information is updated. In other embodiments, such a review may occur periodically or in response to an instruction message received from another device (such as external managing node 110).

At step 725, method 700 proceeds with the container interface display apparatus detecting a notification event based upon the accessed portion of the managed logistics information. In this embodiment of method 700, the notification event is related to status information associated with the container or an item stored within the container. In more detail, the status information may reflect a detected condition by an internal sensing device (such as a sensor) disposed within the container and coupled to the container interface display apparatus.

In a further embodiment of method 700, the detected condition may be a detected environmental condition within the container, such as a detected or sensed temperature within the container moisture level within the container or detected light within the container. In another embodiment, the detected condition may be a detected movement in what is stored within the container, where the detected movement is sensed by a motion sensor effectively operating as the internal sensing device (e.g., where the motion sensor is the internal sensing device or the motion sensor is part of a larger, more complex embodiment of the internal sensing device). In still another embodiment, the detected condition may be a detected configuration change of what is stored within the container as reflected in a comparison of a current mapping scan of what is stored within the container to a prior mapping scan of what is stored within the container. Such mapping scans may be generated by a depth sensor effectively operating as the internal sensing device.

In another embodiment, the notification event based on the item may be a delivery related parameter associated with the item. In this situation, the content related notification may include an identification of the item and information related to the delivery related parameter for that identified item. As explained above relative to exemplary contents data 280, exemplary delivery related parameter for an item may include a delivery date, a delivery time, a delivery shipment category, a delivery service identifier, and a delivery mode identifier. Such electronic parameters relate to the scheduled delivery of the item and better help to identify how to process the item for improved delivery by leveraging the proactive notification features of the container interface display apparatus.

In a similar embodiment, the notification event based on the status information may comprise a content status related parameter related to a storage space within the container. Exemplary content status related parameters may include information on a detected environmental change within the container, a detected movement within the container, a detected change in a configuration of what is stored within the container.

At step 730, method 700 proceeds with the container interface display apparatus generating the content related notification related the notification event and, in step 735, dynamically displaying information related to the content related notification on a display screen of the container interface display apparatus. In more detail, the information related to the content related notification provided on the display screen may include an identification of the item and a location of the item within the container. Such relevant information provided on the display screen of the container interface display apparatus improves how logistics personnel are kept aware of such a content related notification, such as when the configuration of what has been loaded has unexpectedly shifted within the container during loading or when a specific item having a prioritized delivery or special storing instructions (e.g., specialized tie downs, placement in a particular part of the storage space within the container due to the item's weight, and the like). Further, such information provided on the display screen of the container interface display apparatus may include loading position information to improve and enhance weight/balance requirements involved in loading particular types of containers.

In a further embodiment, the display screen may provide the content related notification to loading personnel when the loading personnel is placing the item within the container and as a sensor deployed on a floor of the container (e.g., one of the sensors that may be implemented as part of internal sensing device 120) verifies the item is in a desired position.

In still another embodiment, the display screen of the container interface display apparatus may provide the content related notification as a type of loading information regarding where the container itself should be loaded based upon one or more items contained within the container. For example, the display screen may be used to inform loading personnel with feedback on where to place the container when loading the container for transport in an aircraft. The container interface display apparatus in this embodiment may be operative to wirelessly communicate with a sensor in a floor of the aircraft that may automatically verify the container is in the correct place via capturing of registration information relative to the desired position or otherwise detecting that the physical container occupies an acceptable footprint location (such as a designated location that is temperature controlled for containers that are shipping live animals on the aircraft). In another embodiment, the container interface display apparatus may scan a barcode placard on the aircraft or otherwise capture relevant loading information broadcast and use the information captured via barcode or broadcast reception to verify proper positioning of the container being loaded.

Further still, an embodiment may have the information related to the content related notification provided on the display screen including one or more scannable objects associated with the item and the content related notification. For example, the content interface display apparatus may generate a specialized electronic display of a scannable barcode reflecting that the container is currently storing one or more items that may include specialized cargo (e.g., live animals), or items that have particular delivery-related restrictions that warrant specialized treatment by ramp personnel involved in loading and/or unloading of the container as well was processing of the container as it is moved on its way to a destination.

At step 740, method 700 may continue in some embodiments with the container interface display apparatus extending its notification reach beyond the display screen by transmitting a notification message to one or more external devices (such as a managing node apparatus (e.g., external managing node 110), a back-end server (e.g., server 100), and/or a user access device (e.g., user access device 140*c*) over a wired or wireless communication path. Such a notification message is associated with the content related notification.

Those skilled in the art will appreciate that certain steps of method 700 as disclosed and explained above in various embodiments may be implemented with an apparatus, such as exemplary container interface display apparatus 150, running an embodiment of logistics information management program code 260 as part of a system that improves how to proactively notify logistics personnel and other logistics entities and nodes based upon an update to managed logistics information related to a container. Such code may be stored on a non-transitory computer-readable medium such as memory storage 215 on container interface display apparatus 150. Thus, when executing code 260, the processing unit 210 of container interface display apparatus 150 may be operative to perform certain operations or steps from the exemplary methods disclosed above, including method 700 and variations of that method.

In more detail, an exemplary container interface display apparatus for generating a content related notification may include a ruggedized housing, a processing unit, a memory, a display screen, and a wireless communication interface. The ruggedized housing is capable of removably mounting to a wall of the container. For example, the housing provides a protective shell for the apparatus that enhances survivability of the apparatus if dropped and provides precipitant (such as dust and moisture) intrusion resistance for adverse operating environments, but allows the apparatus to be temporarily attached to part of the container, such as an exterior wall.

The processing unit is disposed within the housing. The memory, display screen, and wireless communication interface are each respectively coupled to the processing unit. The memory maintains at least a logistics information management program code section for execution by the processing unit as well as managed logistics information (e.g., managed logistics information 270) on what is stored within the container. The display screen is viewable from outside the housing and is disposed relative to the housing in a configuration oriented away from the wall of the container when the housing is mounted to the wall. The wireless communication interface provides the processing unit with access to a wireless communication path and other nodes (such as a managing node apparatus, a back-end server, and a user access device).

The processing unit of the container interface display apparatus, when executing the logistics information management program code section, is specially programmed to be operative to record an update to the managed logistics information in the memory; access at least a portion of the managed logistics information in the memory after recording the update; detect a notification event based upon the accessed portion of the managed logistics information, where the notification event is related to status information associated with the container or an item stored within the container; generate the content related notification related the notification event; and cause the display screen to provide information related to the content related notification on the display screen of the container interface display apparatus (such as an identification of the item associated with the content related notification and a location of the item within the container).

In a further embodiment, the apparatus may further comprise interface circuitry and an internal sensing device (such as a sensor, camera, or other detector) disposed within the container. The interface circuitry may be coupled to the processing unit and disposed within the housing with a connection accessible through the housing. The interface circuitry's connection (e.g., a plug type of connection) operatively couples to the internal sensing device so that the interface circuitry may receive condition information from the internal sensing device. As such, the processing unit may be further operative to maintain the received condition information in the memory as at least part of the status information reflected in the managed logistics information.

The condition information may, for example, indicate a detected environmental condition within the container, a detected movement in what is stored within the container, or a detected configuration change related to what has been stored. In more detail and as explained above, such a detected environmental condition may be detected with a sensor to detect, for example, temperature, light, location, humidity, kinetic or impact force, pressure, atmospheric composition, sound, and smoke relative to within the container where items are stored. To detect a configuration change, the apparatus may deploy at least one depth sensor as the internal sensing device. As such, the configuration change may be detected as a difference between at least two mapping scans of what is stored within the container, where the mapping scans are generated by the depth sensor. For example, as shown in FIG. 4B, one mapping scan may have a configuration of what is stored within container 115 indicating item 410 has shifted from a prior mapped configuration where item 410 may have been initially placed in location 415.

In an embodiment of the container interface display apparatus, the notification event based on the item may include or relate to a delivery related parameter, where the content related notification comprises an identification of the item and information related to the delivery related parameter. In more detail, examples of such a delivery related parameter may include a delivery date, a delivery time, a delivery shipment category, a delivery service identifier, a delivery mode identifier, and a special handling identifier (such as identifier information that the item requires placement at a certain location, is dangerous, is hazardous, or is a live animal).

In a further embodiment, the notification event based on the status information may include or be related to a content status related parameter related to a storage space within the container. For example, a content status related parameter may include information on a detected environmental change within the container, a detected movement within the container, or a detected change in a configuration of what is stored within the container.

Further still, an embodiment of the apparatus may include an identification of the item and a location of the item within the container as part of what is dynamically displayed or otherwise provided as the information related to the content related notification on the display screen. As noted above, such relevant information provided on the display screen of the container interface display apparatus improves how logistics personnel are kept aware of such a content related notification, such as when the configuration of what has been loaded has unexpectedly shifted within the container during loading or when a specific item having a prioritized delivery or special loading, placement, storing, containing instructions (e.g., specialized tie downs, placement in a particular part of the storage space within the container due to the item's weight, activating a heater for the storage space, and the like).

Further still, an embodiment of the apparatus may have the information related to the content related notification provided on the display screen including one or more scannable objects associated with the item and the content related notification. For example, the content interface display apparatus may generate a specialized electronic display of a scannable barcode reflecting that the container is currently storing one or more items that may include specialized cargo (e.g., live animals), or items that have particular delivery-related restrictions that warrant specialized treatment by ramp personnel involved in loading and/or unloading of the container as well was processing of the container as it is moved on its way to a destination.

In yet a further embodiment of the apparatus, the processing unit may be further operative to generate a notification message associated with the content related notification, and cause the wireless communication interface to transmit the notification message to an external device over the wireless communication path. Such an external device, as mentioned above, may comprise, for example, a managing node apparatus, a back-end server, or a user access device.

The embodiment of the container interface apparatus as described above may also include at least one user input device coupled to the processing unit of the container interface display apparatus. As such, the user input device may operate to receive input and provide such input to the processing unit in a manner that alters which of the managed logistics information is shown on the display screen as the portion of the managed logistics information.

While a method of generating a content related notification and an exemplary content interface display apparatus used in such a method is described in embodiments above, a further system embodiment may leverage such an exemplary interface display apparatus. In more detail, such an exemplary system may be implemented as an enhanced logistics monitoring system for generating a content related notification based upon managed logistics information related to a container (such as a unit load container (ULD) for transport on an aircraft, a storage container area integrated as part of a vehicle, a tractor trailer, or an intermodal container for intermodal shipment In this embodiment, the system includes at least a container interface display apparatus and a second node device (such as managing node apparatus, a back-end server, and a user access device that may directly or indirectly be in communication with the container interface display apparatus). The container interface display apparatus is disposed on the container (such as on an exterior wall of the container) and includes at least a housing, processing unit, memory, display screen, and a wireless communication interface. The housing is a ruggedized type of housing and is capable of being mounted to the exterior wall of the container as described above and, for example, similar to housing 200 as explained with reference to FIG. 2. The processing unit is disposed within the housing, and is respectively coupled to each of the memory, the display screen, and the wireless communication interface. The memory maintains at least a logistics information management program code section for execution by the processing unit, along with managed logistics information on what is stored within the container. The display screen is viewable outside the housing and disposed relative to the housing in a configuration oriented away from the exterior wall of the container when the housing is mounted to the exterior wall. The wireless communication interface provides the processing unit with access to a wireless communication path.

In operation, the processing unit of the container interface display apparatus, when executing the logistics information management program code section, is operative to record an update to the managed logistics information in the memory (e.g., when the container interface display apparatus has received or detected relevant container information as the update to the managed logistics information); access at least a portion of the managed logistics information in the memory after recording the update; detect a notification event based upon the accessed portion of the managed logistics information, where the notification event is related to status information associated with the container or an item stored within the container; generate the content related notification related the notification event; cause the display screen to provide information related to the content related notification on the display screen; generate a notification message associated with the content related notification; and cause the wireless communication interface to transmit the notification message to the second node device over the wireless communication path.

The second node device in the system is in operative communication with the wireless communication interface of the container interface display apparatus over the wireless communication path. The second node device further comprises a logistics data store device (such as a memory storage or database storage) for maintaining logistics operation related information involving the container. Further, the second node device is operative to receive the notification message from the wireless communication interface of the container interface display apparatus, and update the logistics operation related information maintained in the logistics data store device based upon the notification message.

In a further embodiment, the container interface display apparatus of the system may further comprise an internal sensor that is disposed within the container and coupled to the processing unit. As such, the processing unit may be further operative to receive condition information from the internal sensor and store the condition information in the memory as part of the status information in the managed logistics information. Such condition information may, for example, indicate a detected environmental condition within the container (when the internal sensor is a type of environmental sensor as described in more detail above—such as a temperature sensor, a light sensor, etc.), a detected movement in what is stored within the container (when the internal sensor is a motion sensor), or a detected configuration change in what is stored within the container (when the internal sensor is a depth sensor). Such a detected configuration change may, for example, be a result of comparing at least two mapping scans of what is stored within the container to find a difference in such mapping scans generated by the depth sensor and the difference is significant to reflect a noted configuration change. Those skilled in the art will appreciate that the amount of such a detected difference in mapping scans may depend, for example, on a size of the container and relative sizes of items stored within the container that may move or otherwise shift in ways that are deemed undesirable and requiring further logistics intervention to correct and potentially prevent further problems with the container and its contents.

In more detail, the system embodiment may have the notification event based on the item further comprising a delivery related parameter, and where the content related notification identifies the item and includes information related to the delivery related parameter, such as information related to a delivery date, a delivery time, a delivery shipment category, a delivery service identifier, and a delivery mode identifier for the item.

In a further embodiment, the notification event based on the status information may, for example, comprise a content status related parameter related to a storage space within the container. Such a content status related parameter may include information on a detected environmental change within the container, a detected movement within the container, and a detected change in a configuration of what is stored within the container.

In still a further system embodiment, the information related to the content related notification provided on the display screen may include specific type of information, such as an identification of the item and a location of the item within the container and, in some examples, include one or more scannable objects associated with the item and the content related notification.

The system embodiment describe above may have the second node device being operative to interact with a third node device. For example, in an embodiment where the second node device is external managing node 110, the third node device may correspond to the back-end server 100. In another example where the second node device is external managing node 110, the third node may be separate third party server or other node device not shown in FIG. 1 that may be separately associated with a distinct delivery entity and in communication with external managing node 110 directly or via indirect communications facilitated through server 100. Such a distinct delivery entity may, once the container is unloaded, become responsible for one or more items currently stored within the container.

In more detail, in the context of such an extended system embodiment involving a third node device operative to interact with the second node device, the second node device may transmit a logistics operation message to a third node device based upon the notification message received from the container interface display apparatus. The logistics operation message generally provides information related to the notification. For example, the logistics operation message may indicate a prioritized unloading operation to be performed on the container based upon the notification message, or may identify specific items that will become the responsibility of the delivery entity associated with the third node device. In more detail, the third node device may be related to a delivery service entity. As such, the logistics operation message may be an update notification to the delivery entity, where the update notification relates to the notification event (which may identify the item, status information related to the container, status information related to an item, or provide condition information related to the container and/or what is stored within the container). Examples of such a third node device may include a delivery service entity managing node apparatus (in similar form as external managing node 110 but associated with a particular delivery service entity), a delivery service entity back-end server (in similar form as server 100 but associated with a particular delivery service entity), and a delivery service entity user access device (in similar form as user access nodes 140a-140c but associated with a particular delivery service entity and used by logistics personnel associated with the delivery service entity).

FURTHER PARTICULAR EMBODIMENTS

What follows below is a listing of exemplary sets of particular embodiments focusing on one or more aspects of the different embodiments described above. Each of the different sets of particular embodiments respectively effect improvements to logistics-related technology that employs an exemplary container interface display apparatus as part of enhanced logistics operations that are electronically monitored and managed. As such, within each further embodiment heading are numbered aspects describing a specific technological application of one or more container interface display apparatus or systems using such an apparatus that improve or otherwise enhance these technical fields, as explained and supported by the disclosure above. Each numbered aspect appearing below the different headings may make reference to other numbered aspects that appear below that particular heading.

Further Embodiment 1—Methods, Apparatus, and Systems for Managing Logistics Information Related a Container Having a Scale 1. A method for managing logistics information related to a container using a container interface display apparatus, the method comprising: identifying, by a scanner of the container interface display apparatus, the item during loading of the container; recording, in a memory of the container interface display apparatus, an association between the container being loaded and the identified item, the association being part of the managed logistics information related to the container; detecting, by a scale disposed within the container, a weight of the item loaded within the container, wherein the scale is disposed within the container and operatively coupled to the container interface display apparatus while supporting the weight of the item; receiving, by the container interface display apparatus, a signal from the scale, wherein the signal indicates the detected weight of the item; recording, in the memory of the container interface display apparatus, the detected weight of the identified item, the detected weight being part of the managed logistics information related to the container; generating electronic logistics monitor information on the display screen of the container interface display apparatus, wherein the electronic logistics monitor information comprises at least a portion of the managed logistics information.

2. The method of embodiment 1 further comprising: incrementally identifying, by the scanner, a plurality of additional items as the additional items are loaded within the container; incrementally recording a plurality of additional associations in the memory, wherein each of the additional associations respectively represent a relationship between the container and each of the additional items loaded within the container, wherein the additional associations are part of the managed logistics information related to the container; incrementally detecting, by the scale, respective weights for each of the additional items loaded within the container, wherein the respective weights for each of the additional items are part of the managed logistics information related to the container; periodically generating an update of the electronic logistics electronic information on the display screen related to the managed logistics information, wherein the update reflects a logistics status of the container during loading.

3. The method of embodiment 2, wherein the logistics status of the container indicates item-level information on the contents presently loaded within the container.

4. The method of embodiment 2, wherein the logistics status of the container indicates container-level information on the contents presently loaded within the container.

5. The method of embodiment 4, wherein the container-level information further comprises at least a current weight of the contents presently loaded within the container.

6. The method of embodiment 1 further comprising attaching the container interface display apparatus to a part of the container in an orientation permitting the scanner to identify the item to be shipped within the container as the item is being loaded within the container.

7. The method of embodiment 6 wherein the part of the container comprises at least one of an exterior wall of the container, an interior wall of the container, a structural support member within the container, or a door associated with an access entry to the container.

8. The method of embodiment 1 further comprising coupling the container interface display apparatus to the scale within the container.

9. The method of embodiment 8, wherein the step of coupling the container interface display apparatus to the scale further comprises establishing, by the container interface display apparatus, a wireless connection between the container interface display apparatus and a node device associated with the container, wherein the node device is connected to the scale within the container and operative to provide the detected weight of the item to the container interface display apparatus over the wireless connection.

10. The method of embodiment 1 further comprising: operatively coupling the container interface display apparatus to a depth sensing device disposed above a storage space within the container; mapping, by the depth sensing device coupled to the container interface display apparatus, the storage space once the item is loaded within the container to generate dimensional data reflecting an occupied configuration of the storage space; transmitting a message by the depth sensing device to the container interface display apparatus, wherein the message reflects the occupied configuration of the storage space; and recording, in the memory of the container interface display apparatus, the occupied configuration of the storage space as part of the managed logistics information related to the container.

11. The method of embodiment 1, wherein the managed logistics information further comprises container shipping information.

12. The method of embodiment 11, wherein the container shipping information comprises an inventory of what is intended to be loaded into the container.

13. The method of embodiment 12, wherein the container shipping information comprises location specific information of where the item should be loaded within the container.

14. The method of embodiment 13, wherein the location specific information relates to the weight of the item.

15. The method of embodiment 1, wherein the step of generating the electronic logistics monitor information on the display screen of the container interface display apparatus further comprises selecting the portion of the managed logistics information to display based upon input from logistics personnel involved in loading the container, and generating the selected portion of the managed logistics information to the logistics personnel on the display screen as a logistics status of the container during loading.

16. The method of embodiment 1, wherein the container comprises one from a group consisting of a unit load container (ULD) for transport on an aircraft, a storage container area integrated as part of a vehicle; a tractor trailer pulled with a truck; an intermodal container for intermodal shipment.

17. The method of embodiment 1, wherein the electronic logistics monitor information comprises barcode data.

18. An improved system for managing logistics information related to a loading operation for a shippable item, the system comprising:

a container used for transporting the shippable item, the container further comprising a storage space within the container for maintaining the shippable item once loaded within the container, an entry through which to access the storage space as part of loading the container, and a scale disposed within the storage space of the container to support the shippable item once loaded within the container; and a container interface display apparatus disposed on a wall of the container near the entry, the container interface display apparatus further comprising a processing unit, a scanner operatively coupled to the processing unit, wherein the scanner is operative to receive an identification signal identifying the shippable item during loading of the container, a scale interface circuit coupled to the processing unit and operatively coupled to the scale of the container, the scale interface circuit being operative to receive a signal from the scale, wherein the signal indicates a detected weight of the shippable item once loaded within the container, a memory coupled to the processing unit, wherein the memory maintaining at least a logistics information management program code section for execution by the processing unit, wherein the memory is further operative to maintain the managed logistics information related to the loading operation comprising at least (a) an association between the container and the shippable item and (b) the detected weight of the shippable item, and a display screen coupled to the processing unit, wherein the display screen is oriented on the wall of the container for interaction with logistics personnel loading the container; and wherein the processing unit of the container interface display apparatus, when executing the logistics information management program code section, is operative to identify the shippable item based upon the identification signal received by the scanner; record the association in the memory as part of the managed logistics information after identifying the shippable item; record the detected weight in the memory as part of the managed logistics information based upon the signal received from the scale; cause the display screen to provide electronic logistics monitor information on the display screen, wherein the electronic logistics monitor information comprises at least a portion of the managed logistics information maintained in the memory.

19. The system of embodiment 18, wherein the portion of the managed logistics information provided on the display screen indicates item-level information on the contents presently loaded within the container.

20. The system of embodiment 18, wherein the portion of the managed logistics information provided on the display screen indicates container-level information on the contents presently loaded within the container.

21. The system of embodiment 20, wherein the container-level information further comprises at least a current weight of the contents presently loaded within the container.

22. The system of embodiment 18, wherein the container interface display apparatus is removably attached to the wall of the container in an orientation permitting the scanner to identify the shippable item during a loading operation of the container.

23. The system of embodiment 18 further comprising a depth sensing device disposed above the storage space and operative to communicate with the container interface display apparatus, wherein the depth sensing device is further operative to map the storage space once the item is loaded within the container to generate dimensional data reflecting an occupied status of the storage space, and transmit a message to the container interface display apparatus, wherein the message reflects the occupied status of the storage space; and wherein the processing unit of the container interface display apparatus is further operative to receive the message from the depth sensing device; determine the occupied status of the storage space based upon the message; and record the occupied status of the storage space as part of the managed logistics information related to the container.

24. The system of embodiment 18, wherein the managed logistics information further comprises container shipping information.

25. The system of embodiment 24, wherein the container shipping information comprises an inventory of what is intended to be loaded into the container.

26. The system of embodiment 25, wherein the container shipping information comprises location specific information of where the item should be loaded within the container.

27. The system of embodiment 26, wherein the location specific information may relate to the weight of the item.

28. The system of embodiment 18 further comprising at least one user input device coupled to the processing unit of the container interface display apparatus, wherein the at least one user input device allowing interaction with the container interface display apparatus to selectively alter which of the managed logistics information is shown on the display screen as the portion of the managed logistics information.

29. The system of embodiment 18, wherein the container used for transporting the shippable item comprises one from a group consisting of a unit load container (ULD) for transport on an aircraft, a storage container area integrated as part of a vehicle, a tractor trailer pulled with a truck, an intermodal container for intermodal shipment.

30. The system of embodiment 18, wherein the electronic logistics monitor information comprises barcode data.

31. An improved system for managing logistics information related to a loading operation for a shippable item, the system comprising:

a container used for transporting the shippable item, wherein the container has a storage space within the container and an integrated scale disposed within the storage space to support the shippable item once loaded within the container, wherein the integrated scale generates a signal reflecting a weight of what is supported on the scale; and a container interface display apparatus removably disposed on an exterior wall of the container, the container interface display apparatus further comprising a housing removably attached to the exterior wall of the container; a processing unit disposed within the housing; a scanner disposed at least partially within the housing, the scanner being operatively coupled to the processing unit, wherein the scanner is operative to receive an identification signal identifying the shippable item during loading of the container; interface circuitry coupled to the processing unit and disposed within the housing with a connection to the interface circuitry accessible through the housing, wherein the connection of the interface circuitry is operatively coupled to the integrated scale of the container, the interface circuitry being operative to receive the generated signal from the integrated scale indicating a detected weight of the shippable item once loaded onto the integrated scale; a memory coupled to the processing unit, wherein the memory maintaining at least a logistics information management program code section for execution by the processing unit, wherein the memory is further operative to maintain the managed logistics information related to the loading operation comprising at least (a) an association between the container and the shippable item and (b) the detected weight of the shippable item; a display screen coupled to the processing unit, wherein the display screen is disposed on the housing in a configuration oriented away from the exterior wall of the container for interaction with logistics personnel loading the container; and a wireless communication interface operatively coupled to the processing unit, wherein the wireless communication interface provides the processing unit with access to a wireless communication path;

a managing node device in operative communication with the wireless communication interface of the container interface display apparatus over the wireless communication path, wherein the managing node device further comprises a logistics data store device for maintaining information related to the loading operation;

wherein the processing unit of the container interface display apparatus, when executing the logistics information management program code section, is operative to identify the shippable item based upon the identification signal received by the scanner; record the association in memory as part of the managed logistics information after identifying the shippable item; record the detected weight in memory as part of the managed logistics information based upon the signal received from the integrated scale; cause the display screen to provide electronic logistics monitor information on the display screen, wherein the electronic logistics monitor information comprises at least a portion of the managed logistics information maintained in the memory; cause the wireless communication interface to transmit a message to the managing node device, wherein the message relates to the managed logistics information related to the container; and wherein the managing node device is operative to receive the message from the container interface display apparatus, and update the logistics data store device with the managed logistics information as communicated in the message.

32. The system of embodiment 31, wherein the portion of the managed logistics information provided on the display screen indicates item-level information on the contents presently loaded within the container.

33. The system of embodiment 31, wherein the portion of the managed logistics information provided on the display screen indicates container-level information on what is loaded within the storage space.

34. The system of embodiment 33, wherein the container-level information further comprises at least a current weight of what is loaded within the storage space.

35. The system of embodiment 31, wherein the scanner is operative to capture at least one of a reflected barcode scan signal or an emitted identification device signal as the identification signal identifying the shippable item.

36. The system of embodiment 31 further comprising a depth sensing device disposed above the storage space and operative to communicate with the container interface display apparatus through the interface circuitry, wherein the depth sensing device is further operative to map the storage space once the shippable item is loaded within the storage space to generate dimensional data reflecting an occupied status of the storage space; and notify the container interface display apparatus of the occupied status of the storage space based upon the generated dimensional data;

wherein the interface circuitry receives the notification from the depth sensing device and communicates the notification to the processing unit; and wherein the processing unit is further operative to receive the communication from the interface circuitry regarding the notification; determine the occupied status of the storage space based upon the communication; record the occupied status of the storage space in the memory as part of an update to the managed logistics information related to the container, and cause the wireless communication interface to transmit an occupied status message to the managing node device, wherein the occupied status message relates to the update to the managed logistics information related to the container.

37. The system of embodiment 31, wherein the managed logistics information further comprises container shipping information.

38. The system of embodiment 37, wherein the container shipping information comprises an inventory of what is intended to be loaded into the container.

39. The system of embodiment 38, wherein the container shipping information comprises location specific information of where the item should be loaded within the container.

40. The system of embodiment 39, wherein the location specific information may relate to the weight of the item.

41. The system of embodiment 31 further comprising at least one user input device coupled to the processing unit of the container interface display apparatus, wherein the at least one user input device allowing the logistics personnel to selectively provide input that alters which of the managed logistics information is shown on the display screen as the portion of the managed logistics information.

42. The system of embodiment 31, wherein the container used for transporting the shippable item comprises one from a group consisting of a unit load container (ULD) for transport on an aircraft, a storage container area integrated as part of a vehicle; a tractor trailer pulled with a truck; an intermodal container for intermodal shipment.

43. The system of embodiment 31, wherein the electronic logistics monitor information comprises barcode data.

Further Embodiment 2—Methods, Apparatus, and Systems for Generating a Content Related Notification 1. A method for generating a content related notification based upon managed logistics information related to a container using a container interface display apparatus, the method comprising: recording, by the container interface display apparatus, an update to the managed logistics information maintained in a memory of the container interface display apparatus; accessing, by the container interface display apparatus, at least a portion of the managed logistics information maintained in the memory after recording the update; detecting, by the container interface display apparatus, a notification event based upon the accessed portion of the managed logistics information, wherein the notification event is related to status information associated with the container or an item stored within the container; generating, by the container interface display apparatus, the content related notification related the notification event; and dynamically displaying information related to the content related notification on a display screen of the container interface display apparatus.

2. The method of embodiment 1 further comprising securing the container interface display apparatus to an exterior wall of the container in an orientation exposing the display screen outwardly from the exterior wall.

3. The method of embodiment 1 further comprising gathering further relevant container information using the container interface display apparatus; and wherein the update to the managed logistics information maintained in the memory is associated with the gathered relevant container information.

4. The method of embodiment 1, wherein the status information reflects a detected condition by an internal sensing device disposed within the container and coupled to the container interface display apparatus.

5. The method of embodiment 4, wherein the detected condition comprises a detected environmental condition within the container.

6. The method of embodiment 4, wherein the detected condition comprises a detected movement in what is stored within the container, wherein the detected movement is sensed by a motion sensor on the internal sensing device.

7. The method of embodiment 4, wherein the detected condition comprises a detected configuration change of what is stored within the container as reflected in a comparison of a current mapping scan of what is stored within the container to a prior mapping scan of what is stored within the container, wherein the mapping scan is generated by a depth sensor on the internal sensing device.

8. The method of embodiment 1, wherein the notification event based on the item comprises a delivery related parameter associated with the item, and wherein the content related notification comprises an identification of the item and information related to the delivery related parameter.

9. The method of embodiment 8, wherein the delivery related parameter comprises at least one from a group consisting of a delivery date, a delivery time, a delivery shipment category, a delivery service identifier, a delivery mode identifier, and a special handling identifier.

10. The method of embodiment 1, wherein the notification event based on the status information further comprises a content status related parameter related to a storage space within the container.

11. The method of embodiment 10, wherein the content status related parameter comprises at least one from a group consisting of information on a detected environmental change within the container, a detected movement within the container, a detected change in a configuration of what is stored within the container.

12. The method of embodiment 1, wherein the information related to the content related notification provided on the display screen further comprises an identification of the item and a location of the item within the container.

13. The method of embodiment 1, wherein the information related to the content related notification provided on the display screen further comprises one or more scannable objects associated with the item and the content related notification.

14. The method of embodiment 1 further comprising transmitting, by the container interface display apparatus, a notification message to an external device over the wireless communication path, wherein the notification message is associated with the content related notification.

15. The method of embodiment 14, wherein the external device comprises one of a managing node apparatus, a back-end server, and a user access device.

16. The method of embodiment 1, wherein the container comprises one from a group consisting of a unit load container (ULD) for transport on an aircraft, a storage container area integrated as part of a vehicle; a tractor trailer pulled with a truck; an intermodal container for intermodal shipment.

17. A container interface display apparatus for generating a content related notification based upon managed logistics information related to a container, the apparatus comprising: a ruggedized housing capable of removably mounting to a wall of the container; a processing unit disposed within the housing; a memory coupled to the processing unit, wherein the memory maintaining at least a logistics information management program code section for execution by the processing unit, wherein the memory further maintaining the managed logistics information on what is stored within the container; a display screen coupled to the processing unit, wherein the display screen is viewable outside the housing and disposed relative to the housing in a configuration oriented away from the wall of the container when the housing is mounted to the wall; a wireless communication interface operatively coupled to the processing unit, wherein the wireless communication interface provides the processing unit with access to a wireless communication path; and wherein the processing unit of the container interface display apparatus, when executing the logistics information management program code section, is operative to record an update to the managed logistics information in the memory; access at least a portion of the managed logistics information in the memory after recording the update; detect a notification event based upon the accessed portion of the managed logistics information, wherein the notification event is related to status information associated with the container or an item stored within the container; generate the content related notification related the notification event; and cause the display screen to provide information related to the content related notification on the display screen.

18. The apparatus of embodiment 17 further comprising: an internal sensing device disposed within the container; interface circuitry coupled to the processing unit and disposed within the housing with a connection to the interface circuitry accessible through the housing, wherein the connection of the interface circuitry is operatively coupled to the internal sensing device to receive condition information from the internal sensing device; and wherein processing unit is further operative to maintain the received condition information in the memory as at least part of the status information reflected in the managed logistics information.

19. The apparatus of embodiment 18, wherein the condition information indicates a detected environmental condition within the container.

20. The apparatus of embodiment 18, wherein the internal sensing device comprises at least a motion sensor; and wherein the condition information indicates a detected movement in what is stored within the container, wherein the detected movement is sensed by the motion sensor.

21. The apparatus of embodiment 18, wherein internal sensing device comprises at least a depth sensor exposed to a storage space within the container; and wherein the condition information indicates a detected configuration change between at least two mapping scans of what is stored within the container, wherein the mapping scans are generated by the depth sensor on the internal sensing device.

22. The apparatus of embodiment 17, wherein the notification event based on the item comprises a delivery related parameter, and wherein the content related notification comprises an identification of the item and information related to the delivery related parameter.

23. The apparatus of embodiment 22, wherein the delivery related parameter comprises at least one from a group consisting of a delivery date, a delivery time, a delivery shipment category, a delivery service identifier, a delivery mode identifier, and a special handling identifier.

24. The apparatus of embodiment 17, wherein the notification event based on the status information further comprises a content status related parameter related to a storage space within the container.

25. The apparatus of embodiment 24, wherein the content status related parameter comprises at least one from a group consisting of information on a detected environmental change within the container, a detected movement within the container, a detected change in a configuration of what is stored within the container.

26. The apparatus of embodiment 17, wherein the information related to the content related notification provided on the display screen comprises an identification of the item and a location of the item within the container.

27. The apparatus of embodiment 17, wherein the information related to the content related notification provided on the display screen comprises one or more scannable objects associated with the item and the content related notification.

28. The apparatus of embodiment 17, wherein the processing unit is further operative to generate a notification message associated with the content related notification; and cause the wireless communication interface to transmit the notification message to an external device over the wireless communication path.

29. The apparatus of embodiment 28, wherein the external device comprises one of a managing node apparatus, a back-end server, and a user access device.

30. The apparatus of embodiment 17, wherein the container comprises one from a group consisting of a unit load container (ULD) for transport on an aircraft, a storage container area integrated as part of a vehicle; a tractor trailer; an intermodal container for intermodal shipment.

31. The apparatus of embodiment 17 further comprising at least one user input device coupled to the processing unit of the container interface display apparatus, wherein the at least one user input device receives input that alters which of the managed logistics information is shown on the display screen as the portion of the managed logistics information.

32. An enhanced logistics monitoring system for generating a content related notification based upon managed logistics information related to a container, the system comprising:

a container interface display apparatus disposed on an exterior wall of the container, the container interface display apparatus further comprising a ruggedized housing capable of being mounted to the exterior wall of the container; a processing unit disposed within the housing; a memory coupled to the processing unit, wherein the memory maintaining at least a logistics information management program code section for execution by the processing unit, wherein the memory further maintaining the managed logistics information on what is stored within the container; a display screen coupled to the processing unit, wherein the display screen is viewable outside the housing and disposed relative to the housing in a configuration oriented away from the exterior wall of the container when the housing is mounted to the exterior wall; and a wireless communication interface operatively coupled to the processing unit, wherein the wireless communication interface provides the processing unit with access to a wireless communication path; and a second node device in operative communication with the wireless communication interface of the container interface display apparatus over the wireless communication path, wherein the second node device further comprises a logistics data store device for maintaining logistics operation related information involving the container;

wherein the processing unit of the container interface display apparatus, when executing the logistics information management program code section, is operative to record an update to the managed logistics information in the memory; access at least a portion of the managed logistics information in the memory after recording the update; detect a notification event based upon the accessed portion of the managed logistics information, wherein the notification event is related to status information associated with the container or an item stored within the container; generate the content related notification related the notification event; cause the display screen to provide information related to the content related notification on the display screen; generate a notification message associated with the content related notification; and cause the wireless communication interface to transmit the notification message to the second node device over the wireless communication path; and wherein the second node device is operative to receive the notification message from the wireless communication interface of the container interface display apparatus, and update the logistics operation related information maintained in the logistics data store device based upon the notification message.

33. The system of embodiment 32, wherein the container interface display apparatus of the system further comprises an internal sensor disposed within the container and coupled to the processing unit, wherein the processing unit is further operative to receive condition information from the internal sensor and store the condition information in the memory as part of the status information in the managed logistics information.

34. The system of embodiment 33, wherein the condition information indicates a detected environmental condition within the container.

35. The system of embodiment 33, wherein the internal sensor comprises a motion sensor; and wherein the condition information indicates a detected movement in what is stored within the container, wherein the detected movement is sensed by the motion sensor.

36. The system of embodiment 33, wherein the internal sensor comprises at least a depth sensor exposed to a storage space within the container; and wherein the condition information indicates a detected configuration change between at least two mapping scans of what is stored within the container, wherein the mapping scans are generated by the depth sensor.

37. The system of embodiment 32, wherein the notification event based on the item further comprises a delivery related parameter, and wherein the content related notification comprises an identification of the item and information related to the delivery related parameter.

38. The system of embodiment 37, wherein the delivery related parameter comprises at least one from a group consisting of a delivery date, a delivery time, a delivery shipment category, a delivery service identifier, a delivery mode identifier, and a special handling identifier.

39. The system of embodiment 32, wherein the notification event based on the status information further comprises a content status related parameter related to a storage space within the container.

40. The system of embodiment 39, wherein the content status related parameter comprises at least one from a group consisting of information on a detected environmental change within the container, a detected movement within the container, a detected change in a configuration of what is stored within the container.

41. The system of embodiment 32, wherein the information related to the content related notification provided on the display screen comprises an identification of the item and a location of the item within the container.

42. The system of embodiment 32, wherein the information related to the content related notification provided on the display screen comprises one or more scannable objects associated with the item and the content related notification.

43. The system of embodiment 32, wherein the container comprises one from a group consisting of a unit load container (ULD) for transport on an aircraft, a storage container area integrated as part of a vehicle, a tractor trailer, and an intermodal container for intermodal shipment.

44. The system of embodiment 32, wherein the second node device comprises one of a managing node apparatus, a back-end server, and a user access device.

45. The system of embodiment 32, wherein the second node device is further operative to transmit a logistics operation message to a third node device based upon the notification message.

46. The system of embodiment 45, wherein the logistics operation message indicates a prioritized unloading operation to be performed on the container based upon the notification message.

47. The system of embodiment 45, wherein the third node device is related to a delivery service entity, and wherein the logistics operation message comprises a update notification to the delivery entity, wherein the update notification relates to the notification event and the item.

48. The system of embodiment 47, wherein the third node device comprises one of a delivery service entity managing node apparatus, a delivery service entity back-end server, and a delivery service entity user access device used by logistics personnel associated with the delivery service entity.

In summary, it should be emphasized that the sequence of operations to perform any of the methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics operations, such as loading/processing/unloading a container, managing what is loaded in the container, notifying other entities regarding what is loaded in the container, increasing efficiency of logistics operations relative to the container, and detecting notification events related to the container and/or what is stored in the container and proactively issuing alert notifications about such events. Moreover, at least some of the exemplary embodiments disclosed herein may be used independently from one another and/or in combination with one another and may have applications to devices and methods not disclosed herein. However, those skilled in the art will appreciate that the exemplary container interface display apparatus, systems using such an apparatus, and methods of how such an apparatus may operate as part of a logistics operation as described above provide enhancements and improvements to technology used in logistics and shipment operations.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the claims below, is intended to cover modifications and variations.

What is claimed:

1. A container interface display apparatus for managing logistics information related to a container, the apparatus comprising:
    a housing;
    a processing unit within the housing;
    a memory within the housing and operatively coupled to the processing unit, wherein the memory maintaining at least a logistics information management program code section for execution by the processing unit, package count information, and association information;
    a scanner within the housing and operatively coupled to the processing unit, wherein the scanner is operative to scan and identify an item to be shipped with the container as the item is being loaded within the container;
    a wireless communication interface within the housing and operatively coupled to the processing unit, the wireless communication interface allowing communication with a node device over a wireless communication path;
    a coupling attached to the housing and configured to be attached to an exterior wall of the container; and
    a display screen attached to the housing and operatively coupled to the processing unit, wherein the display screen provides for interaction with logistics personnel loading the container; and wherein the processing unit, when executing the logistics information management program code section, is operative to identify the item during loading of the container based upon a scanning result signal sent by the scanner to the processing unit;

update the association information maintained in the memory, wherein the updated association information reflects at least an association between the container being loaded and the identified item, wherein the association information is part of the managed logistics information related to the container;

increment the package count information maintained in the memory, wherein the incremented package count information at least reflects that the item to be shipped within the container is loaded within the container, the package count information being part of the managed logistics information related to the container; and cause the display screen to provide electronic logistics monitor information on the display screen, wherein the electronic logistics monitor information comprises at least a portion of the managed logistics information related to the container.

2. The apparatus of claim 1, wherein the coupling allows the housing to be removably attached to the exterior wall of the container.

3. The apparatus of claim 1, wherein the managed logistics information further comprises identification information for the container.

4. The apparatus of claim 1, wherein the managed logistics information further comprises container shipping information.

5. The apparatus of claim 4, wherein the container shipping information comprises an inventory of what is intended to be loaded into the container.

6. The apparatus of claim 4, wherein the container shipping information comprises location specific information of where the item should be loaded within the container.

7. The apparatus of claim 1, wherein the electronic logistics monitor information provided on the display screen further comprises one or more scannable objects representing one or more parts of the managed logistics information related to the container.

8. The apparatus of claim 1, further comprising an identification sensor operatively coupled to the processing unit, wherein the identification sensor is configured to identify a type of the container, wherein the type of the container being part of the managed logistics information related to the container.

9. The apparatus of claim 8, wherein the identification sensor is further operative to detect container type registry information associated with the container and provide a container type signal to the processing unit; and wherein the processing unit is further operative to identify the type of the container based upon the container type signal provided by the identification sensor.

10. The apparatus of claim 9, wherein the container type registry information comprises one from a group consisting of barcode information associated with the container and dimensional information associated with the container.

11. The apparatus of claim 1, wherein the wireless communication interface is further operative to receive a subset of the managed logistics information from a node device; and wherein the processing unit is further operative to receive the received subset of the managed logistics information from the wireless communication interface and store the received subset of the managed logistics information within the memory of the apparatus.

12. The apparatus of claim 1, wherein the display screen is further operative to display interactive content as the electronic logistics monitor information.

13. The apparatus of claim 12, wherein the display screen comprises a ruggedized touchscreen.

14. The apparatus of claim 13, wherein the ruggedized touchscreen comprises an ingress protection rated display interface.

15. The apparatus of claim 1, further comprising at least one user input device coupled to the processing unit, wherein the at least one user input device allowing interaction with the apparatus to modify the managed logistics information.

16. The apparatus of claim 1, further comprising at least one user input device coupled to the processing unit, wherein the at least one user input device receives input from a user to select the portion of the managed logistics information to show on the display screen.

17. A method for managing logistics information related to a container using a container interface display apparatus, wherein the container interface display apparatus comprises a housing that has a coupling that is attached to an external wall of the container, a display screen attached to the housing, a memory within the housing, a scanner within the housing and oriented to permit identifying an item to be shipped within the container as the item is loaded within the container, and a wireless communication interface within the housing and operative to communicate with a node device, the method comprising:

identifying, by the scanner of the integrated container interface display apparatus, the item during loading of the container;

recording, in the memory of the integrated container interface display apparatus, an association between the container being loaded and the identified item, the association being part of the managed logistics information related to the container;

updating, in the memory of the integrated container interface display apparatus, package count information to reflect the that the identified item is loaded within the container, the package count information being part of the managed logistics information related to the container; and generating electronic logistics monitor information on the display screen of the integrated container interface display apparatus, wherein the electronic logistics monitor information comprises at least a portion of the managed logistics information related to the container.

18. The method of claim 17, wherein the managed logistics information further comprises identification information for the container.

19. The method of claim 17, wherein the managed logistics information further comprises container shipping information.

20. The method of claim 19, wherein the container shipping information comprises an inventory of what is intended to be loaded into the container.

21. The method of claim 19, wherein the container shipping information comprises location specific information on how to load the container.

22. The method of claim 17, wherein the electronic logistics monitor information generated on the display screen of the container interface display apparatus further comprises one or more scannable objects representing one or more parts of the managed logistics information related to the container.

23. The method of claim 22, wherein the one or more scannable objects comprise one or more optically scannable objects selectively generated on the display screen.

24. The method of claim 17, further comprising preloading the memory of the integrated container interface display apparatus through the wireless communication interface with at least a subset of the managed logistics information before the loading of the container begins.

25. A method for managing logistics information related to a container using a container interface display apparatus, wherein the container interface display apparatus comprises a mountable housing, a display screen attached to the mountable housing, a memory within the mountable housing, a scanner within the mountable housing, and a wireless communication interface within the mountable housing, the method comprising:
- attaching a coupling of the mountable housing to an external wall of the container, the container interface display apparatus having an orientation permitting the scanner to identify an item to be shipped within the container as the item is being loaded within the container;
- identifying, by the scanner of the container interface display apparatus, the item during loading of the container;
- recording, in the memory of the container interface display apparatus, an association between the container being loaded and the identified item, the association being part of the managed logistics information related to the container;
- incrementing, in the memory of the container interface display apparatus, package count information to reflect that the item to be shipped within the container is loaded within the container, the package count information being part of the managed logistics information related to the container; and
- generating electronic logistics monitor information on the display screen of the container interface display apparatus, wherein the electronic logistics monitor information comprises at least a portion of the managed logistics information related to the container.

26. The method of claim 25, wherein the managed logistics information further comprises a second association between the container being loaded and a previously identified second item.

27. The method of claim 25, wherein the updated package count information further comprises information that reflects what has previously been loaded within the container.

28. The method of claim 25, wherein the managed logistics information further comprises identification information for the container.

29. The method of claim 25, wherein the managed logistics information further comprises container shipping information.

30. The method of claim 29, wherein the container shipping information comprises an inventory of what is intended to be loaded into the container.

31. The method of claim 29, wherein the container shipping information comprises location specific information of where the item should be loaded within the container.

32. The method of claim 25, wherein the electronic logistics monitor information generated on the display screen of the container interface display apparatus further comprises one or more scannable objects representing one or more parts of the managed logistics information related to the container.

33. The method of claim 25, further comprising the step of identifying, using an identification sensor on the container interface display apparatus, a type of the container, wherein the type of the container being part of the managed logistics information related to the container.

34. The method of claim 33, wherein the step of identifying the type of the container further comprises:
- detecting, with the identification sensor, container type registry information associated with the container, and
- identifying the type of the container based upon the detected container type registry information.

35. The method of claim 34, wherein the container type registry information comprises one from a group consisting of barcode information associated with the container and dimensional information associated with the container.

36. The method of claim 25, further comprising preloading the memory of the container interface display apparatus with at least a subset of the managed logistics information before the loading of the container begins.

37. The method of claim 36, wherein the preloading step further comprises:
- receiving, by the wireless communication interface, the subset of the managed logistics information from a node device operative to communicate with the container interface display apparatus over the wireless communication interface; and
- storing the received subset of the managed logistics information within the memory of the container interface display apparatus.

38. The method of claim 25, wherein the step of generating the electronic logistics monitor information on the display screen of the container interface display apparatus further comprises generating the electronic logistics monitor information on the display screen by selecting the portion of the managed logistics information to display based upon input from logistics personnel involved in loading the container, and generating the selected portion of the managed logistics information to the logistics personnel on the display screen.

* * * * *